US010211912B2

(12) United States Patent
Tani et al.

(10) Patent No.: US 10,211,912 B2
(45) Date of Patent: Feb. 19, 2019

(54) SATELLITE COMMUNICATION SYSTEM, SATELLITE REPEATER, REPEATING METHOD, COMMUNICATION NETWORK CONTROL STATION, SATELLITE COMMUNICATION METHOD, AND METHOD TO PERFORM DATA TRANSMISSION

(71) Applicant: Mitsubishi Electric Corporation, Chiyoda-ku (JP)

(72) Inventors: Shigenori Tani, Tokyo (JP); Katsuyuki Motoyoshi, Tokyo (JP); Hiroyasu Sano, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 22 days.

(21) Appl. No.: 15/111,110

(22) PCT Filed: Dec. 17, 2014

(86) PCT No.: PCT/JP2014/006286
§ 371 (c)(1),
(2) Date: Jul. 12, 2016

(87) PCT Pub. No.: WO2015/114715
PCT Pub. Date: Aug. 6, 2015

(65) Prior Publication Data
US 2016/0352413 A1    Dec. 1, 2016

(30) Foreign Application Priority Data
Jan. 28, 2014    (JP) .................................. 2014-012913

(51) Int. Cl.
*H04W 16/18* (2009.01)
*H04B 7/185* (2006.01)
(Continued)

(52) U.S. Cl.
CPC ....... *H04B 7/18515* (2013.01); *H04B 7/0695* (2013.01); *H04B 7/18517* (2013.01); *H04B 7/2041* (2013.01)

(58) Field of Classification Search
CPC ... H04W 16/18; H04W 24/02; H04W 52/243; H04B 7/18515; H04B 7/0695; H04B 7/2041; H04Q 7/38
See application file for complete search history.

(56) References Cited

U.S. PATENT DOCUMENTS 4,689,625 A    8/1987   Barmat
6,654,357 B1 * 11/2003  Wiedeman ......... H04B 7/18534
                                                370/315

(Continued)

FOREIGN PATENT DOCUMENTS

JP    2010-278886 A    12/2010
WO    WO 2014/001837 A1    1/2014

OTHER PUBLICATIONS

Don Wilcoxson, "Advanced Commercial Satellite Systems Technology for Protected Communications", Military Communications Conference, Department of Defense Programs, Track 6, pp. 2280-2285, (2011).

(Continued)

*Primary Examiner* — Wei Zhao
(74) *Attorney, Agent, or Firm* — Oblon, McClelland, Maier & Neustadt, L.L.P.

(57) ABSTRACT

In a satellite communication system to relay communication between a terminal and a gateway installed on the ground through a satellite repeater, the satellite repeater forms a user link beam for communicating with the terminal and a feeder link beam for communicating with the gateway in a same area, and changes frequency or polarization association with respect to each of the user link beam and the feeder link (Continued)

beam, based on a traffic situation. Thus, a capacity that can be communicated by the beam may be changed after satellite launching.

17 Claims, 20 Drawing Sheets

(51) Int. Cl.
*H04B 7/204* (2006.01)
*H04B 7/06* (2006.01)

(56) References Cited

U.S. PATENT DOCUMENTS

| | | |
|---|---|---|
| 2009/0286467 A1 | 11/2009 | Miller |
| 2010/0008245 A1* | 1/2010 | Viger ................. H04L 47/10 370/252 |
| 2010/0315949 A1 | 12/2010 | Agarwal |
| 2012/0120869 A1 | 5/2012 | Miller |
| 2013/0331026 A1 | 12/2013 | O'Neill et al. |
| 2013/0336203 A1 | 12/2013 | Dankberg et al. |
| 2014/0177521 A1 | 6/2014 | Agarwal |
| 2015/0147959 A1* | 5/2015 | Ha ....................... H04B 7/185 455/13.1 |
| 2015/0188623 A1 | 7/2015 | Angeletti et al. |
| 2016/0050014 A1 | 2/2016 | Agarwal |

OTHER PUBLICATIONS

International Search Report dated Feb. 17, 2015 in PCT/JP14/006286 Filed Dec. 17, 2014.
Japanese Office Action dated Nov. 29, 2016 in patent application No. 2015-559629 with partial English translation.
Partial Supplementary European Search Report dated Aug. 28, 2017 in European Patent Application No. 14880441.2.
Office Action dated Apr. 18, 2017 in Canadian Patent Application No. 2,932,700.
Canadian Office Action dated Dec. 21, 2017 in Canadian Patent Application No. 2,932,700, 4 pages.
Extended European Search Report dated Nov. 21, 2017 in Patent Application No. 14880441.2, 15 pages.
Office Action issued Nov. 2, 2018, in Canadian Patent Application No. 2,932,700 in English.

* cited by examiner

Fig.18

| FEEDER LINK FREQUENCIES | CONNECTION DESTINATION BEAM | USER LINK FREQUENCIES |
|---|---|---|
| fu1~fu2 | 1 | fd1~fd2 |
| fu2~fu3 | 3 | fd5~fd6 |
| ... | ... | ... |
| fu(p-1)~fu(p) | n | fd(q-1)~fd(q) |

1901

SATELLITE COMMUNICATION SYSTEM, SATELLITE REPEATER, REPEATING METHOD, COMMUNICATION NETWORK CONTROL STATION, SATELLITE COMMUNICATION METHOD, AND METHOD TO PERFORM DATA TRANSMISSION

TECHNICAL FIELD

The present invention relates to a satellite communication system.

BACKGROUND ART

There has been introduced a satellite communication system by which communication between two points such as a ship on the earth and an aircraft is performed, using an artificial satellite or the like that operates on an orbit around the earth in an outer space. Such a satellite communication system is implemented by reception of a signal transmitted from a communication device on the earth at a repeater mounted on the artificial satellite and transmission (relay) of the signal to a different communication device on the earth. Recently, multi-beam data transmission for performing data transmission using a beam that is different for each area has been utilized in order to implement an increase in the capacity of the satellite communication system (see Patent Literature 1 and Non-Patent Literature 1 listed below).

CITATION LIST

Patent Literature

Patent Literature 1: US 2013-0336203A

Non-Patent Literature

Non-Patent Literature 1: Don Wilcoxson (ViaSat, Inc.) "Advanced Commercial Satellite Systems Technology for Protected Communications" MILITARY COMMUNICATIONS CONFERENCE, 2011-MILCOM 2011, pp. 2280-2285, November 2011.

SUMMARY OF INVENTION

Technical Problem

The satellite repeater described in each of Patent Literature 1 and Non-Patent Literature 1 is referred to as a bent-pipe type in which the frequency of each beam that can be relayed and connection between the beams cannot be changed after satellite launching. Consequently, there has been a problem that a capacity that may be communicated by the beam cannot be changed after the satellite launching.

The present invention has been made in order to solve the problem as mentioned above. It is an object of the present invention to obtain a satellite communication system capable of changing a capacity that may be communicated by a beam after satellite launching.

Solution to Problem

In a satellite communication system to relay communication between a terminal and a gateway installed on a ground through a satellite repeater, the satellite repeater forms a user link beam for communicating with the terminal and a feeder link beam for communicating with the gateway in a same area, and changes a frequency or polarization association with respect to each of the user link beam and the feeder link beam, based on a traffic situation.

Advantageous Effects of Invention

According to the present invention, a capacity that may be communicated by the beam may be changed after satellite launching.

BRIEF DESCRIPTION OF DRAWINGS

FIG. 18 is a diagram illustrating an example of bandwidth allocation to feeder link beams and user link beams according to Embodiment 1.

DESCRIPTION OF EMBODIMENTS

Embodiment 1

An embodiment of a satellite system and a communication method according to the present invention will be described below in detail, based on the drawings. The present invention is not limited to this embodiment.

First, contents described in Patent Literature 1 and Non-Patent Literature 1 will be described in detail.

An example of multi-beam data transmission disclosed in Non-Patent Literature 1 and Patent Literature 1 will be given, using FIGS. 1 to 4.

Figure 1:
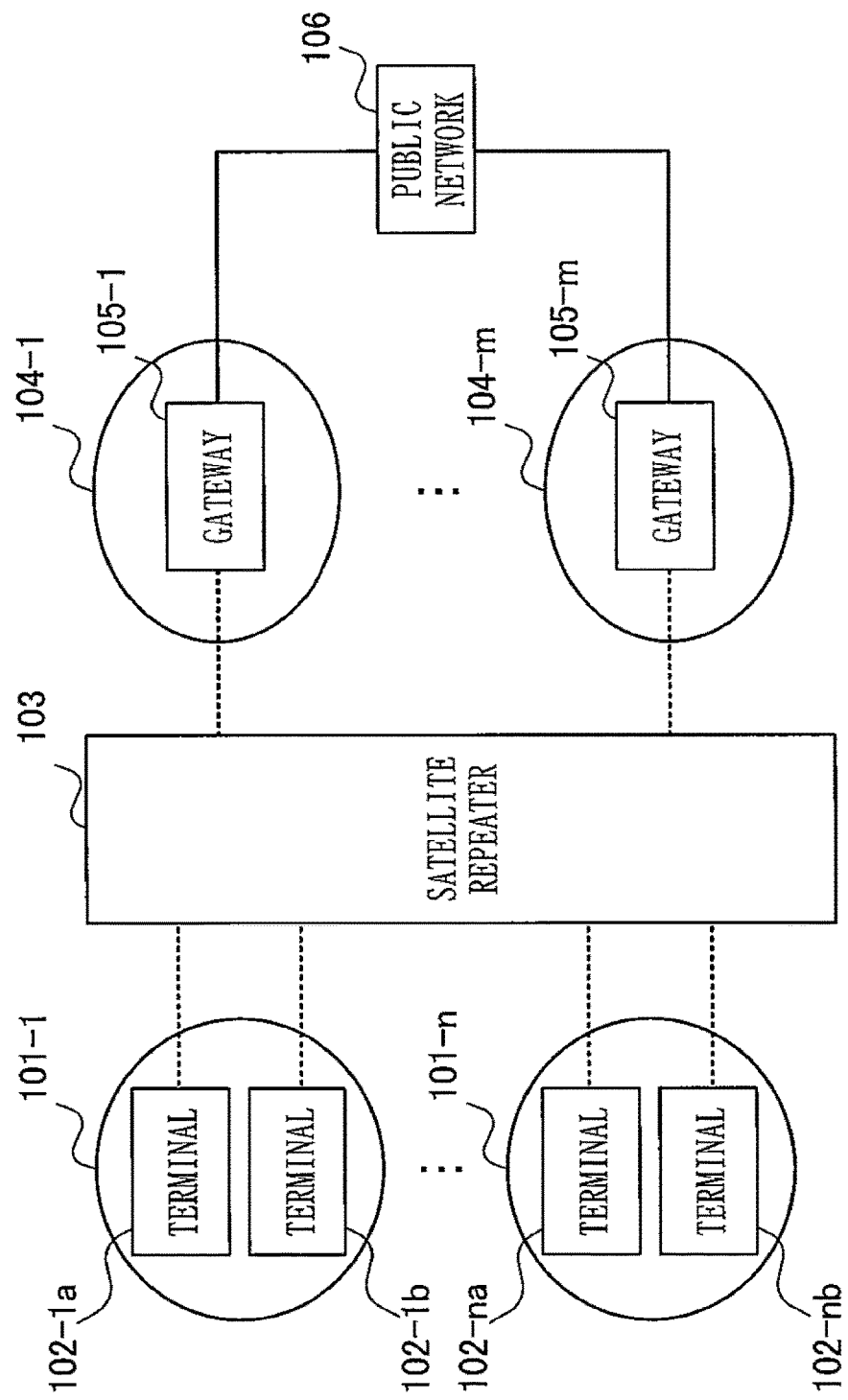
FIG. 1 is a block diagram illustrating a configuration of a system for multi-beam data transmission.

FIG. 1 is a block diagram illustrating a configuration of a system for the multi-beam data transmission. This system is configured with terminals 102-1a to 102-nb, a satellite repeater 103, and gateways 105-1 to 105-m which are wirelessly connected to one another. Dotted lines in FIG. 1 illustrate wireless connections. The gateways 105 are connected to a public network 106 by wires.

The satellite repeater 103 forms n beams 101-1 to 101-n that may be transmitted and received by the terminals 102-1a to 102-nb and m beams 104-1 to 104-m that may be transmitted and received by the gateways 105-1 to 105-m. The terminals 102-1a to 102-nb respectively transmit signals to the satellite repeater 103 using the beams having coverage areas in which the terminals 102-1a to 102-nb themselves are respectively located. The satellite repeater 103 transmits a signal transmitted from each of the terminals 102-1a to 102-nb to one of the gateways 105-1 to 105-m. Communication between two points is thereby implemented. Herein, communication between each of the terminals 102-1a to 102-nb and the satellite repeater 103 is referred to as a user link, while communication between the satellite repeater 103 and each of the gateways 105-1 to 105-m is referred to as a feeder link.

Figure 2:
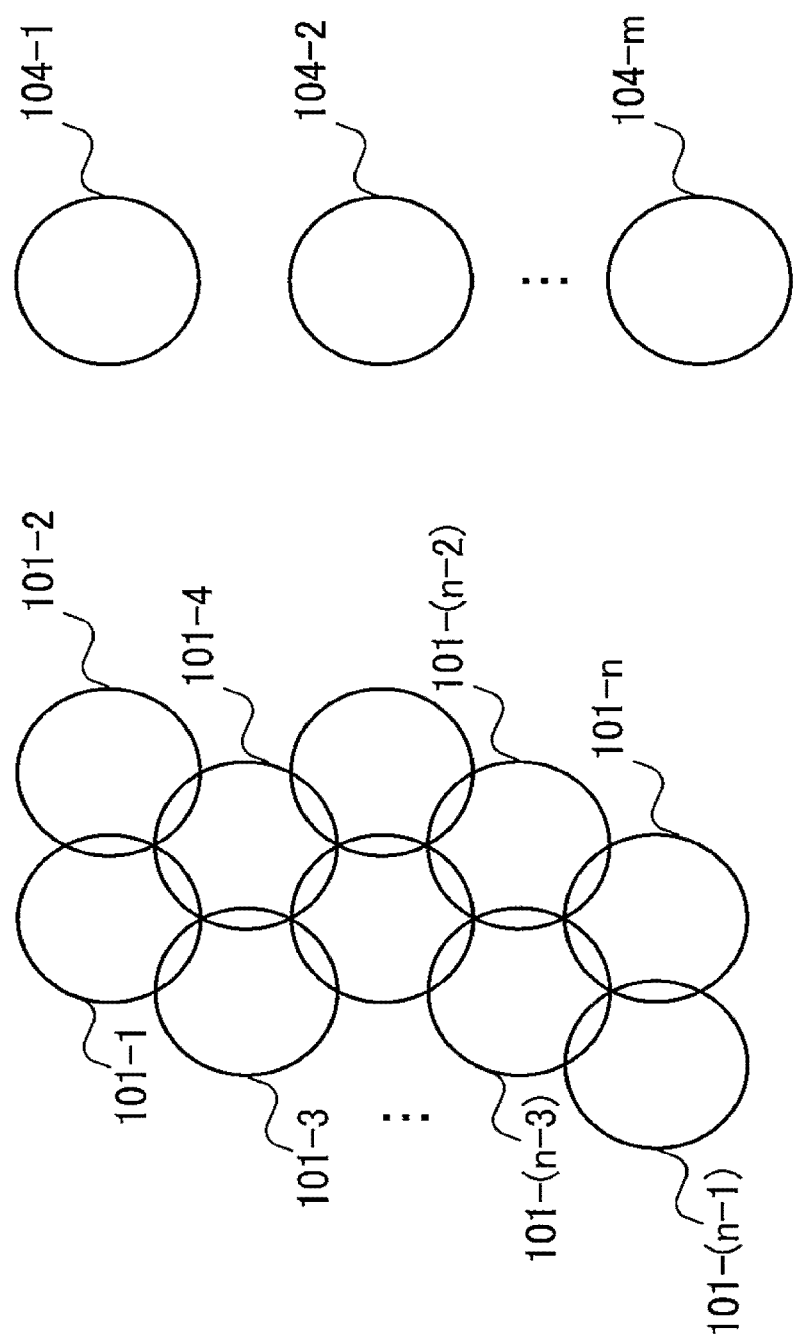
FIG. 2 includes diagrams illustrating a disposition example of user link beams and feeder link beams.

FIG. 2 includes diagrams illustrating a disposition example of the user link beams and the feeder link beams.

The user link beams 101-1 to 101-n are disposed to cover the desired service area of the satellite communication system. Each of the user link beams 101-1 to 101-n uses a frequency and a polarization that are different among adjacent four of the user link beams 101-1 to 101-n. That is, the user link beams 101-1 and 101-(n-3) that are geographically separated may use the same frequency and the same polarization. As types of the polarization, a linear polarization and a circular polarization are provided. The circular polarization is classified into a right hand circular polarization (hereinafter referred to as an RHCP (Right Hand Circular Polarization)) and a left hand circular polarization (hereinafter referred to as an LHCP (Left Hand Circular Polarization)).

Meanwhile, the feeder link beams 104-1 to 104-m are disposed in locations geographically separated from the user link beams 101-1 to 101-n. The respective feeder link beams 104-1 to 104-m are disposed to be geographically separated to one another. By allocating a same frequency to frequencies of the user link and the feeder link and a feeder link frequency of each beam for reuse, a usable bandwidth may be increased. In particular, the Ka-band of 27.0 to 31.0 GHz is allocated for an uplink (for transmission to the satellite repeater 103) and the Ka-band of 17.3 to 21.2 GHz is allocated for a downlink (for transmission from the satellite repeater 103). Since the user link and the feeder link have the frequency that is shared, a system capacity may be increased by spatially reusing the frequency.

Figure 3:
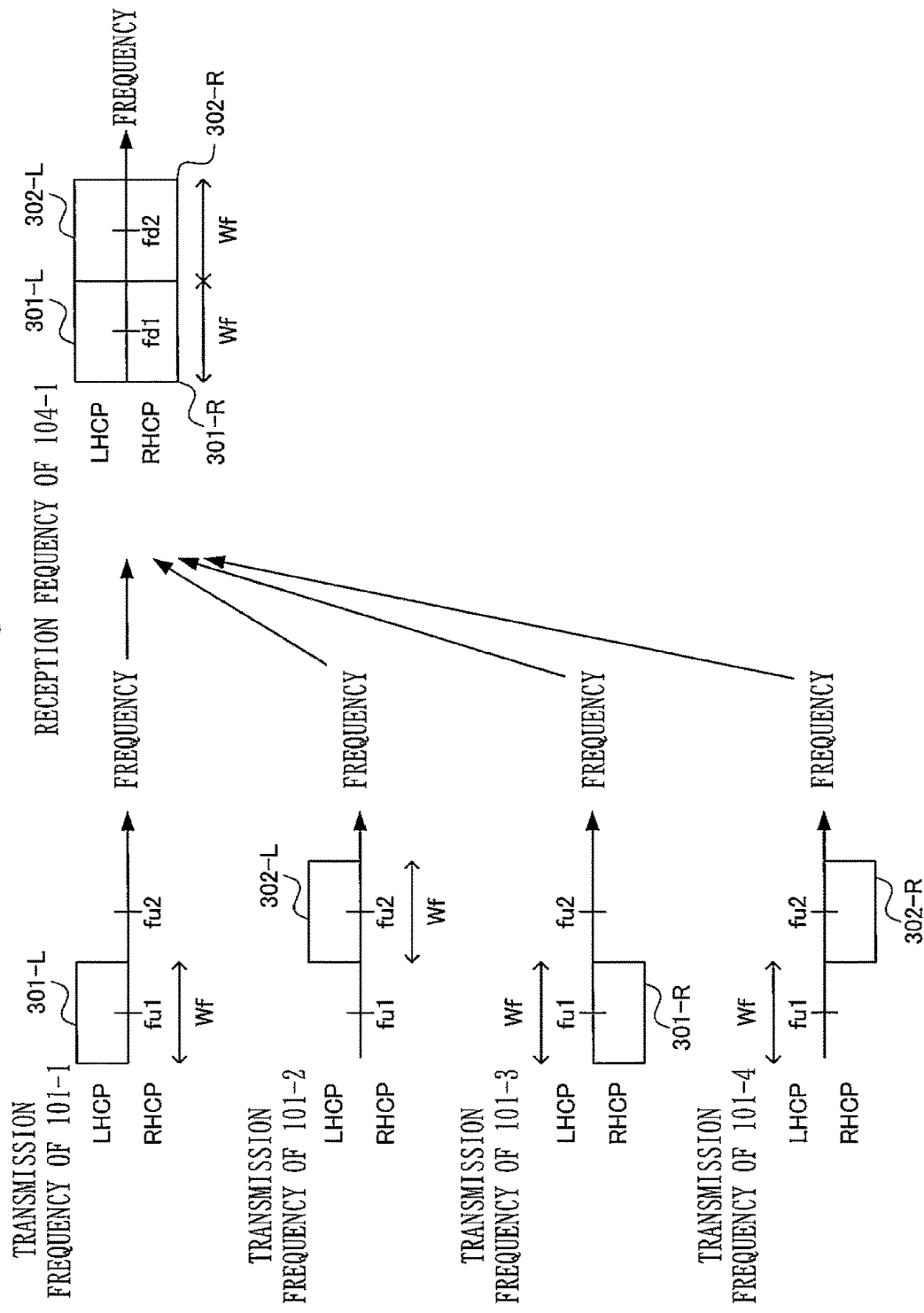
FIG. 3 is a diagram illustrating an example of frequency allocation when transmission is performed from terminals to a gateway.

FIG. 3 is a diagram illustrating an example of frequency allocation when transmission is performed from some of the terminals to one of the gateways.

Figure 4:
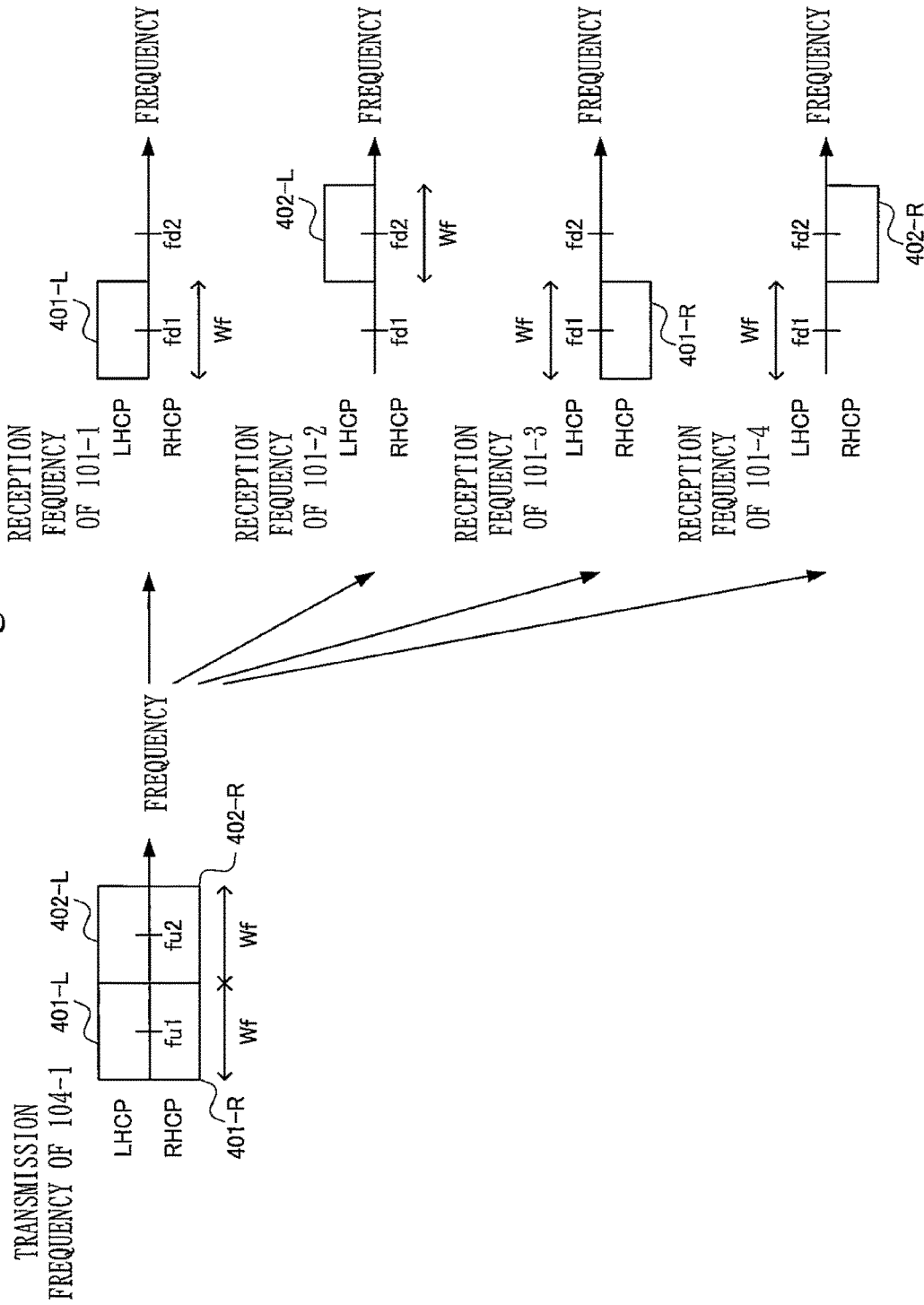
FIG. 4 is a diagram illustrating an example of frequency allocation when transmission is performed from the gateway to the terminals.

FIG. 4 is a diagram illustrating an example of frequency allocation when transmission is performed from the one of the gateways to the some of the terminals.

A bandwidth that may be allocated to each of the user link beams 101-1 to 101-n in FIGS. 3 and 4 is Wf. A bandwidth with polarization that may be allocated to each of the feeder link beams 104-1 to 104-m becomes 4×Wf. The user link beams 101-1 to 101-4 are connected to the feeder link beam 104-1 alone. The user link beams 101-5 to 101-8 are connected to the feeder link beam 104-2 alone. Similarly, the feeder link beam to be connected to each of the user link beam is fixed.

One of combinations of a center frequency fu1 or a center frequency fu2 and one of the LHCPs (301-L and 302-L) and the RHCPs (301-R and 302-R) is allocated to an uplink for each of the user link beams 101-1 to 101-4. The same combination is repeatedly allocated for every four of the user link beams. Center frequencies fd1 and fd2, the LHCPs (301-L and 302-L), and the RHCPs (301-R and 302-R) are allocated to a downlink for the feeder link beam 104-1.

Referring to FIG. 4, the center frequencies fu1 and fu2, LHCPs (401-L and 402-L), and RHCPs (401-R and 402-R) are allocated to an uplink for the feeder link beam 104-1. One of combinations of the center frequency fd1 and the center frequency fd2 and one of the LHCPs (401-L and 402-L) and the RHCPs (401-R and 402-R) is allocated to a downlink for each of the user link beams 101-1 to 101-4. The same combination is repeatedly allocated for every four of the user link beams.

According to Patent Literature 1 and Non-Patent Literature 1, the feeder link beam to which each user link beam is connected is fixed. In addition, positions and the numbers of the feeder link beams cannot be changed after the satellite launching. Consequently, there is the problem that, after the satellite launching, the capacity that may be communicated by each beam cannot be changed.

Then, the following description will be given about the present invention.

Figure 5:
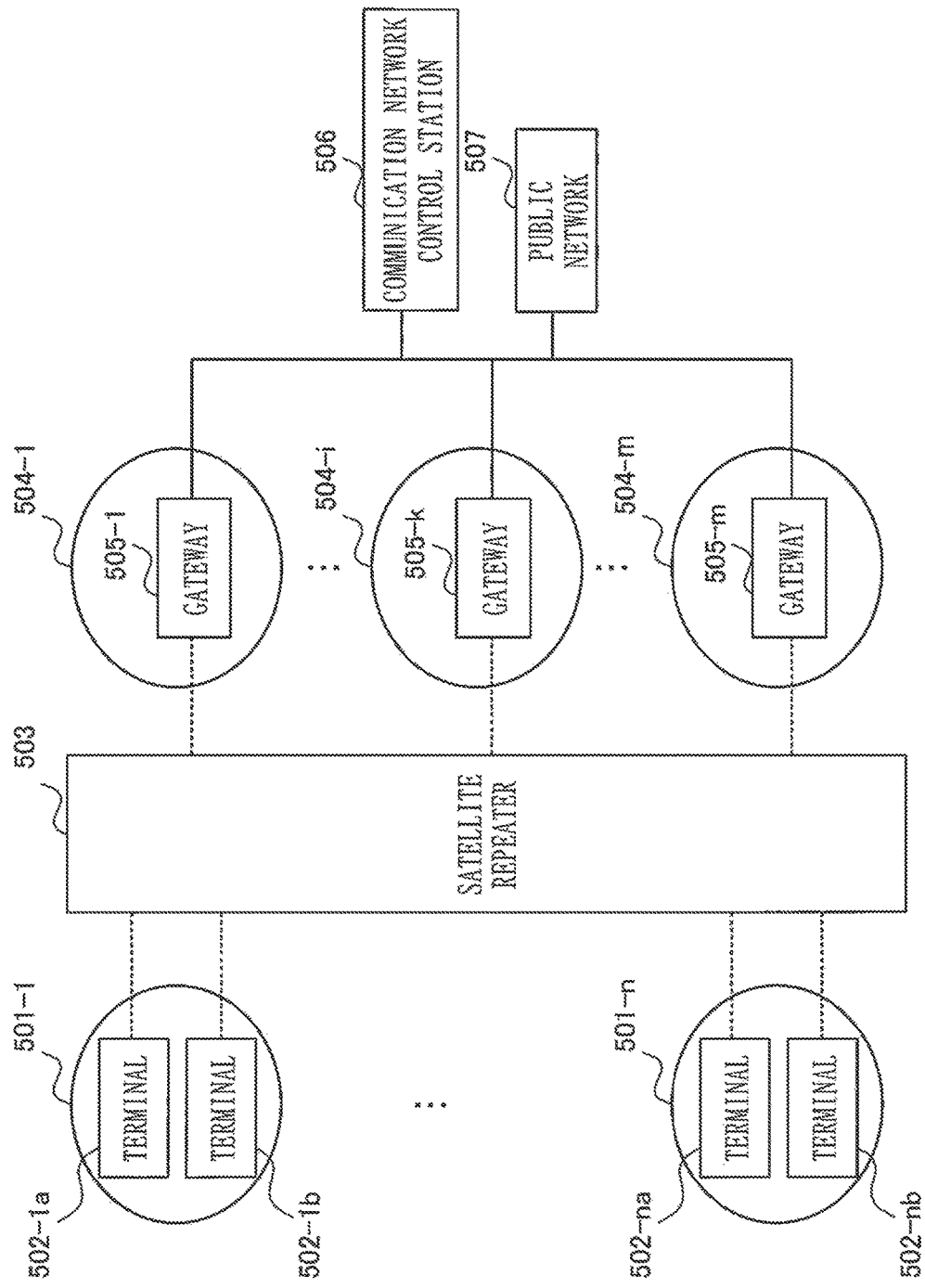
FIG. 5 is a block diagram illustrating a configuration of a satellite communication system according to Embodiment 1.

FIG. 5 is a block diagram illustrating a configuration of the satellite communication system according to Embodiment 1. The satellite communication system is configured with terminals 502-1a to 502-nb, a satellite repeater 503, gateways 505-I to 505-m, and a communication network control station 506. A public network 507 is employed when a service such as the Internet is used through a different communication system connected to an outside of the satellite communication system in this embodiment. When communication is completed within the satellite communication system in this embodiment, the public network 507 is not necessarily needed.

The satellite repeater 503 forms user link beams 501-1 to 501-n for performing transmission and reception with each of the terminals and feeder beams 504-n for performing transmission and reception with each of the gateways 505. The terminals 502-1a to 502-nb and the gateways 505-1 to 505-m are wirelessly connected to the satellite repeater 503. Dotted lines in FIG. 5 indicate wireless connections. The gateways 505 are connected by wires or wirelessly to the communication network control station 506 and the public network 507.

When the terminal 502-1a communicates with the terminal 502-nb, for example, the terminal 502-1a first transmits a signal to the satellite repeater 103, using a band allocated to an uplink for the user link beam 501-1. The satellite repeater 103 transmits the signal to the gateway 505-1, using a band allocated to a downlink for the feeder link beam 504-1. The gateway 505-1 transmits the signal to the gateway 505-m. The gateway 505-m transmits the signal to the satellite repeater 103, using a band allocated to an uplink for the feeder link beam 504-m. The satellite repeater 103 transmits the signal to the terminal 502-nb, using a band allocated to a downlink for the user link beam 501-n. Communication between the terminal 502-1a and the terminal 502-nb is implemented in this way. When each of the terminals 502-1a to 502-nb communicates with a terminal held in the public network 507, one of the gateways 505-1 to 505-m transmits or receives a signal with the public network 507.

Figure 6:
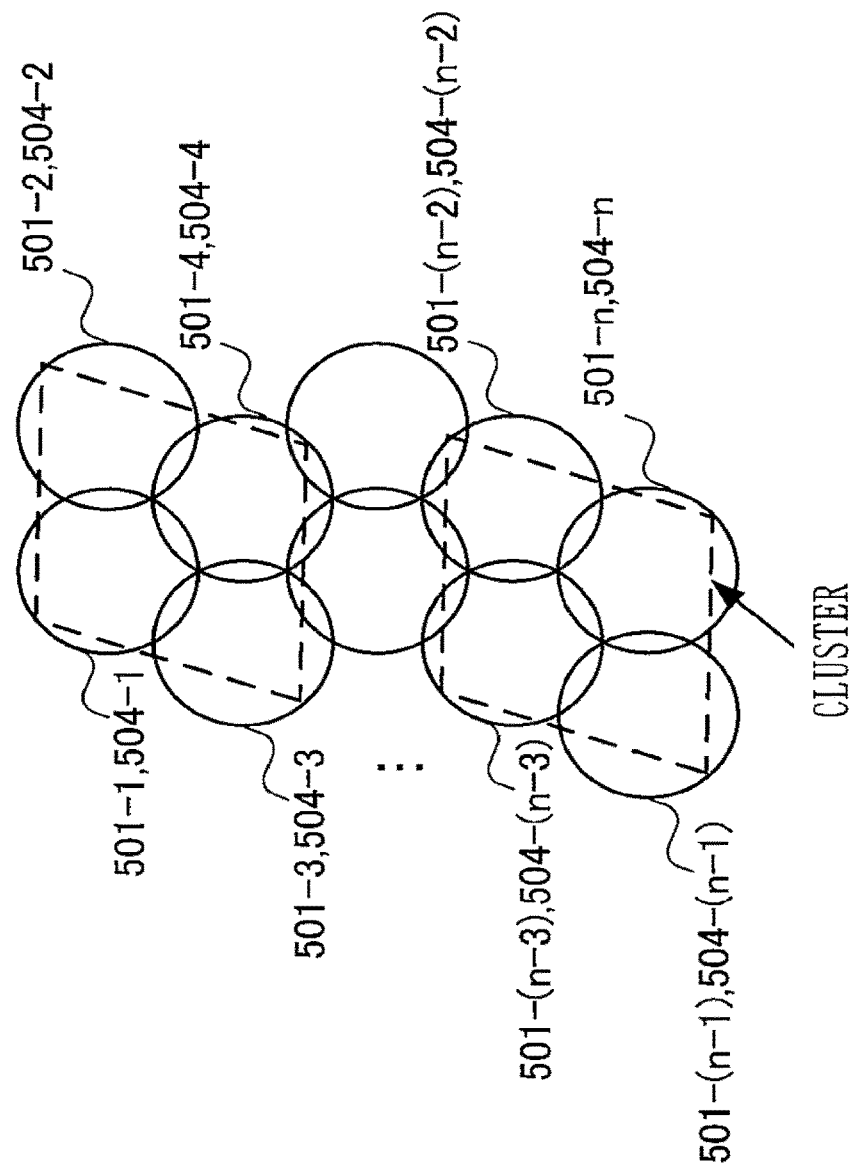
FIG. 6 is a diagram illustrating a disposition example of user link beams and feeder link beams according to Embodiment 1.

FIG. 6 is a diagram illustrating a disposition example of the user link beams and the feeder link beams according to Embodiment 1. The user link beams 501-1 to 501-n are disposed to cover the coverage area surface of the satellite communication system. A frequency and a polarization that are different for every adjacent four beams are allocated to each of the user link beams 501-1 to 501-n.

The user link beams 501-1 to 501-n and the feeder link beams 504-1 to 504-n are beams that are formed in a same area, as illustrated in FIG. 6. Each of the terminals 502-1a to 502-nb and the gateways 505-1 to 505-m may be installed in any one of n beams. Referring to FIG. 5, two terminals are disposed in one user link beam. This disposition of the terminals is one example, and the number of the terminals to be disposed in one user link beam is not limited to two. Further, the gateways 505-1 to 505-m are disposed in all the feeder link beams 504-1 to 504-n. This disposition of the gateways is one example, and the number of the gateways 505-1 to 505-m and the beams in which the gateways 505-1 to 505-m are disposed are not limited to this example.

Now, an example of frequency allocation will be given.

Figure 7:
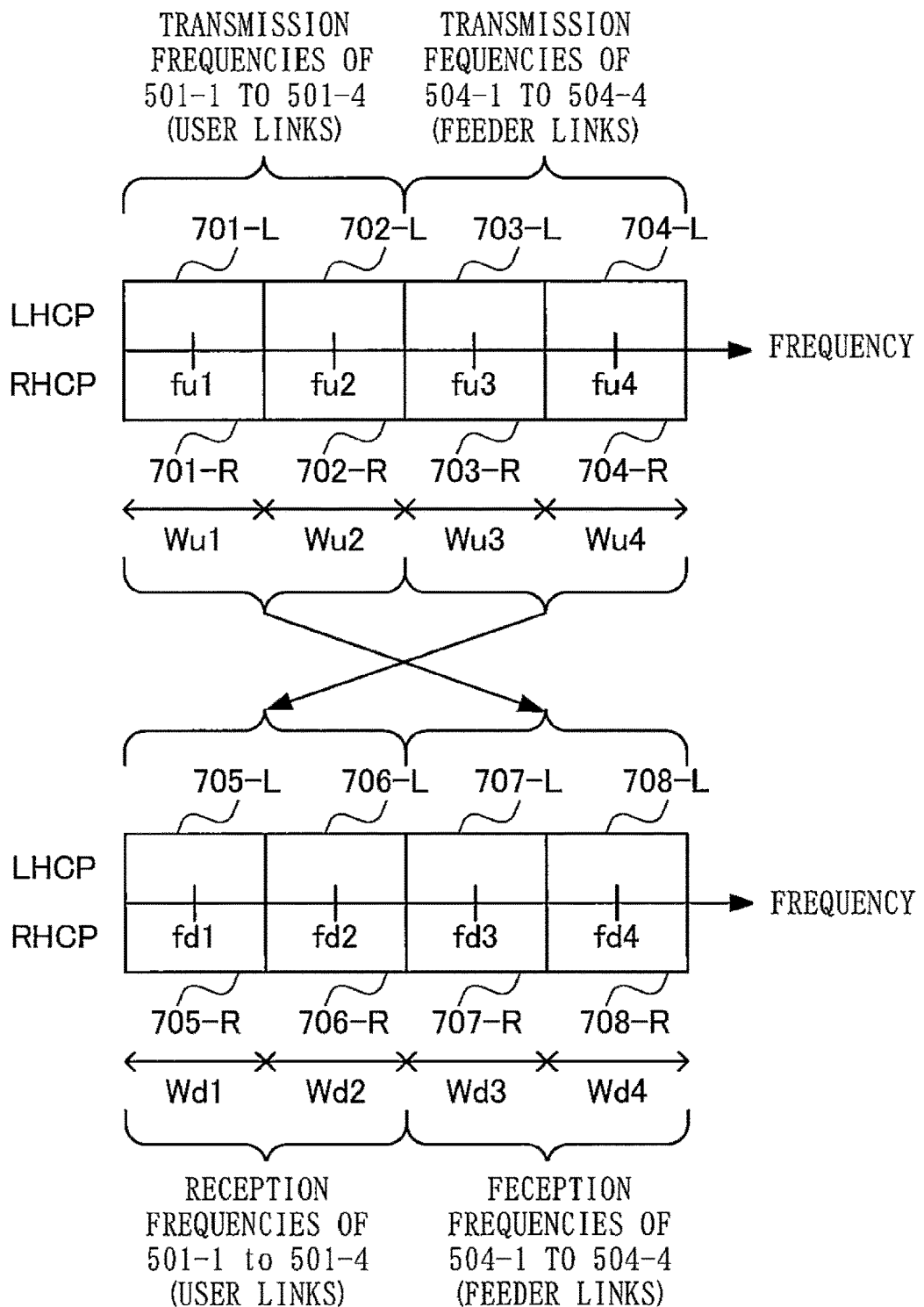
FIG. 7 is a diagram illustrating an example of frequency allocation in the satellite communication system according to Embodiment 1.

FIG. 7 is a diagram illustrating the example of frequency allocation in the satellite communication system according to Embodiment 1. It is assumed that frequency allocation to each beam is controlled by the communication network control station 506, and a specific method of the control will be described later.

Each of the terminals 502-1 to 502-nb and the satellite repeater 503 perform transmission and reception using frequencies and polarizations (LHCPs or RHCPs) that are different for every adjacent four beams. To take an example, one of combinations of the center frequency fu1 or the center frequency fu2 and one of LHCPs (701-L and 702-L) and RHCPs (701-R and 702-R) is allocated to an uplink for each of the user link beams 501-1 to 501-4. The center frequency fu1, a bandwidth Wu1, the LHCP (701-L) are allocated to the user link beam 501-1. The center frequency fu2, a bandwidth Wu2, and the LHCP (702-L) are allocated to the user link beam 501-2. The center frequency fu1, the bandwidth Wu1, and the RHCP (701-R) are allocated to the user link beam 501-3. The center frequency fu2, the bandwidth Wu2, and the RHCP (702-R) are allocated to the user link beam 501-4.

One of combinations of the center frequency fd1 or the center frequency fd2 and one of LHCPs (705-L and 706-L) and RHCPs (705-R and 706-R) is allocated to a downlink for each of the user link beams 501-1 to 501-4. The frequencies are repeatedly used for different user beams, according to the rule similar to that mentioned above. Repeated use of the two frequencies and the two polarizations in this way is referred to as four-color repeated use, and a group of adjacent beams using different four colors is referred to as a cluster.

Similarly, the satellite repeater 503 and each of the gateways 505-1 to 505-n perform transmission and reception using frequencies and polarizations (LHCPs, RHCPs) that are different for every adjacent four beams. One of combinations of a center frequency fu3 or a center frequency fu4 and one of LHCPs (703-L and 704-L) and RHCPs (703-R and 704-R) is allocated to an uplink for each of the feeder link beams 504-1 to 504-4. One of combinations of a center frequency fd3 or a center frequency fd4 and one of LHCPs (707-L and 708-L) and RHCPs (707-R and 708-R) is allocated to a downlink for each of the feeder link beams 504-1 to 504-4.

Since the gateways 505-1 to 505-m are not necessarily disposed in adjacent beams, one-color repeated use of allocating two frequencies and both of the polarizations to a same one of the feeder link beams may be employed. Alternatively, two-color repeated use of sharing one of the frequencies and the polarizations by two feeder link beams may be employed.

In the example in FIG. 7, the satellite repeater 503 relays an uplink signal for each of the user link beams 501-1 to 501-4 to a downlink for each of the feeder link beams 504-1 to 504-4. The satellite repeater 503 relays an uplink signal for each of the feeder link beams 504-1 to 504-4 to each of the user link beams 501-1 to 501-4.

Now, configurations of each of the terminals 502, the satellite repeater 503, each of the gateways 505, and the communication network control station 506 will be described. A public network that has been traditionally used may be employed for the public network 507.

Figure 8:
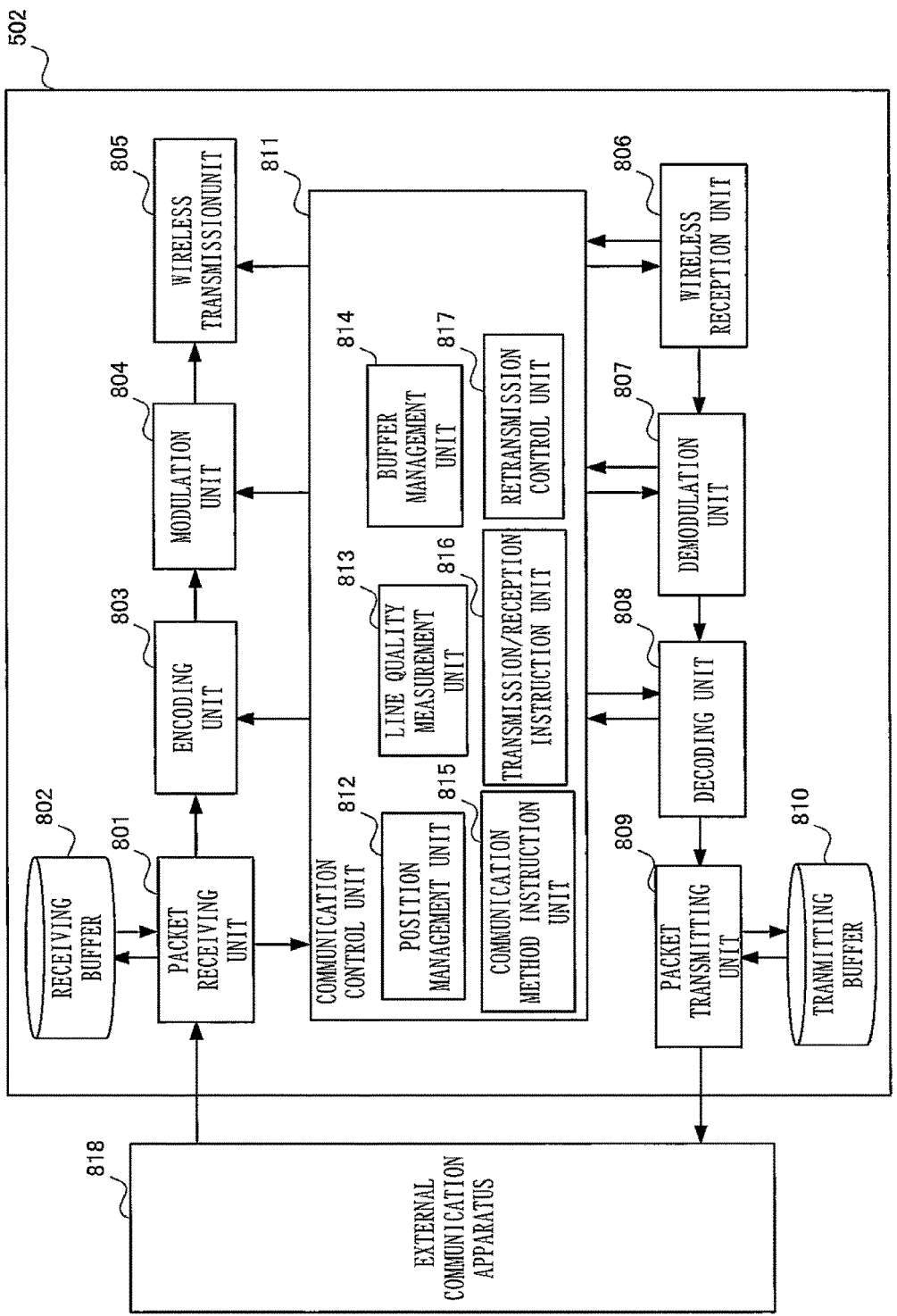
FIG. 8 is a block diagram illustrating a configuration of a terminal according to Embodiment 1.

FIG. 8 is a block diagram illustrating a configuration of each of the terminals 502 according to Embodiment 1. The terminals 502 are the terminals 502-1a to 502-nb in FIG. 5. Each of the terminals 502 is constituted from a packet receiving unit 801, a receiving buffer 802, an encoding unit 803, a modulation unit 804, a wireless transmission unit 805, a wireless reception unit 806, a demodulation unit 807, a decoding unit 808, a packet transmitting unit 809, a transmitting buffer 810, and a communication control unit 811. The communication control unit 811 is constituted from a position management unit 812, a line quality measurement unit 813, a buffer management unit 814, a communication method instruction unit 815, a transmission/reception instruction unit 816, and a retransmission control unit 817. An external communication apparatus 818 is an apparatus to transmit and receive data with each of the terminals 502. A personal computer, for example, may be employed for the external communication apparatus 818.

Figure 9:
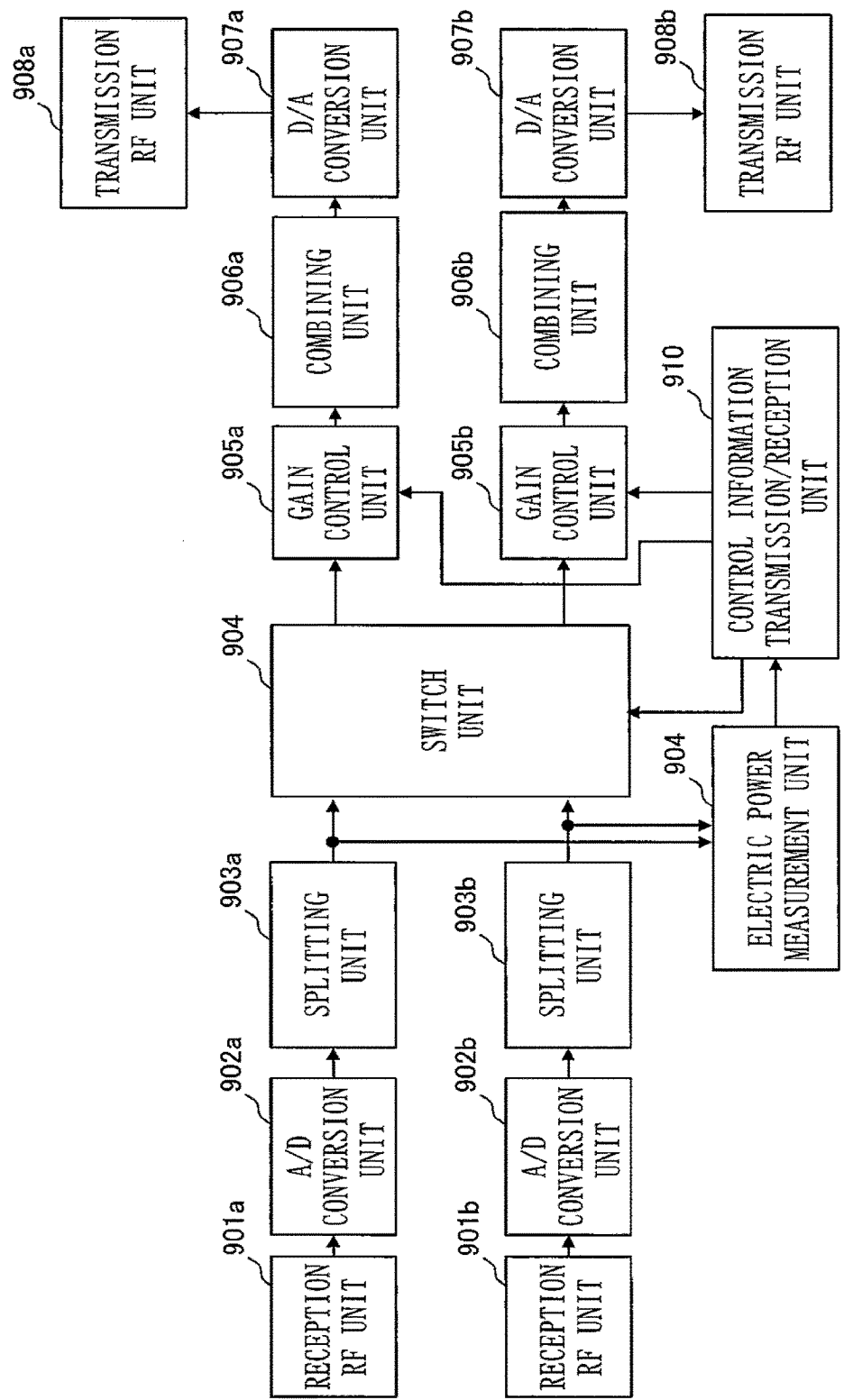
FIG. 9 is a block diagram illustrating a configuration of a satellite repeater according to Embodiment 1.

FIG. 9 is a block diagram illustrating a configuration of the satellite repeater 503 according to Embodiment 1. The satellite repeater 503 is constituted from reception RF units 901a to 901b, A/D conversion units 902a to 902b, splitting units 903a to 903b, a switch unit 904, gain control units 905a to 905b, combining units 906a to 906b, D/A conversion units 907a to 907b, transmission RF units 908a to 908b, an electric power measurement unit 909, and a control information transmission/reception unit 910.

Referring to FIG. 9, components other than the switch unit 904, the electric power measurement unit 909, and the control information transmission/reception unit 910 are each constituted from two systems. This is because the satellite repeater 503 is so configured that a signal included in one beam is processed for each system. The configuration illustrated in FIG. 9 is an example. The number of the systems is not limited to two, and may be any number according to the number of the beams needed by the satellite communication system.

Figure 10:
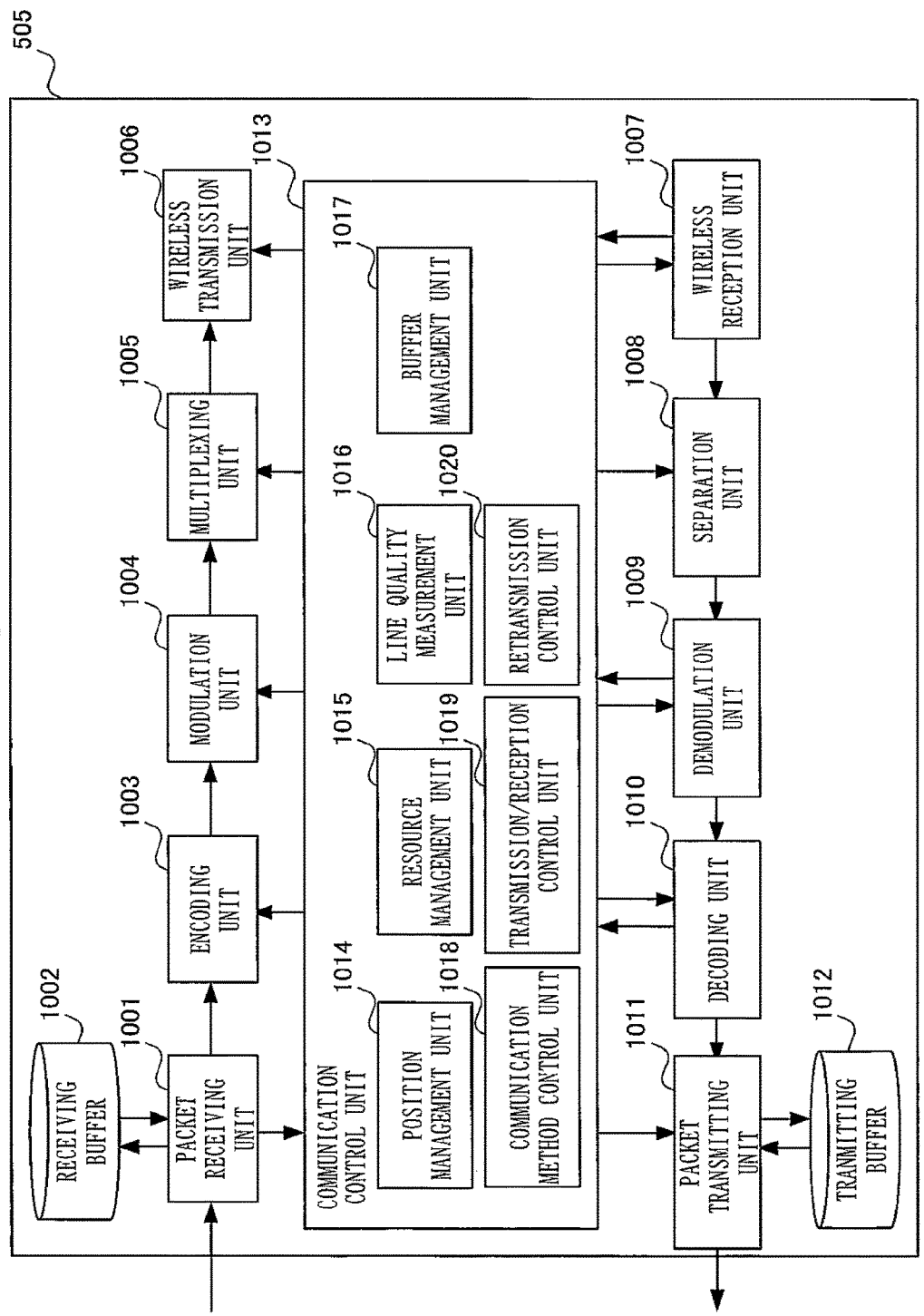
FIG. 10 is a block diagram illustrating a configuration of a gateway according to Embodiment 1.

FIG. 10 is a block diagram illustrating a configuration of each of the gateways 505 according to Embodiment 1. The gateways 505 are the gateways 505-1 to 505-m in FIG. 5. Each of the gateways 505 is constituted from a packet receiving unit 1001, a receiving buffer 1002, an encoding unit 1003, a modulation unit 1004, a multiplexing unit 1005, a wireless transmission unit 1006, a wireless reception unit 1007, a separation unit 1008, a demodulation unit 1009, a decoding unit 1010, a packet transmitting unit 1011, a transmitting buffer 1012, and a communication control unit 1013. The communication control unit 1013 is constituted from a position management unit 1014, a resource management unit 1015, a line quality measurement unit 1016, a buffer management unit 1017, a communication method control unit 1018, a transmission/reception control unit 1019, and a retransmission control unit 1020.

Figure 11:
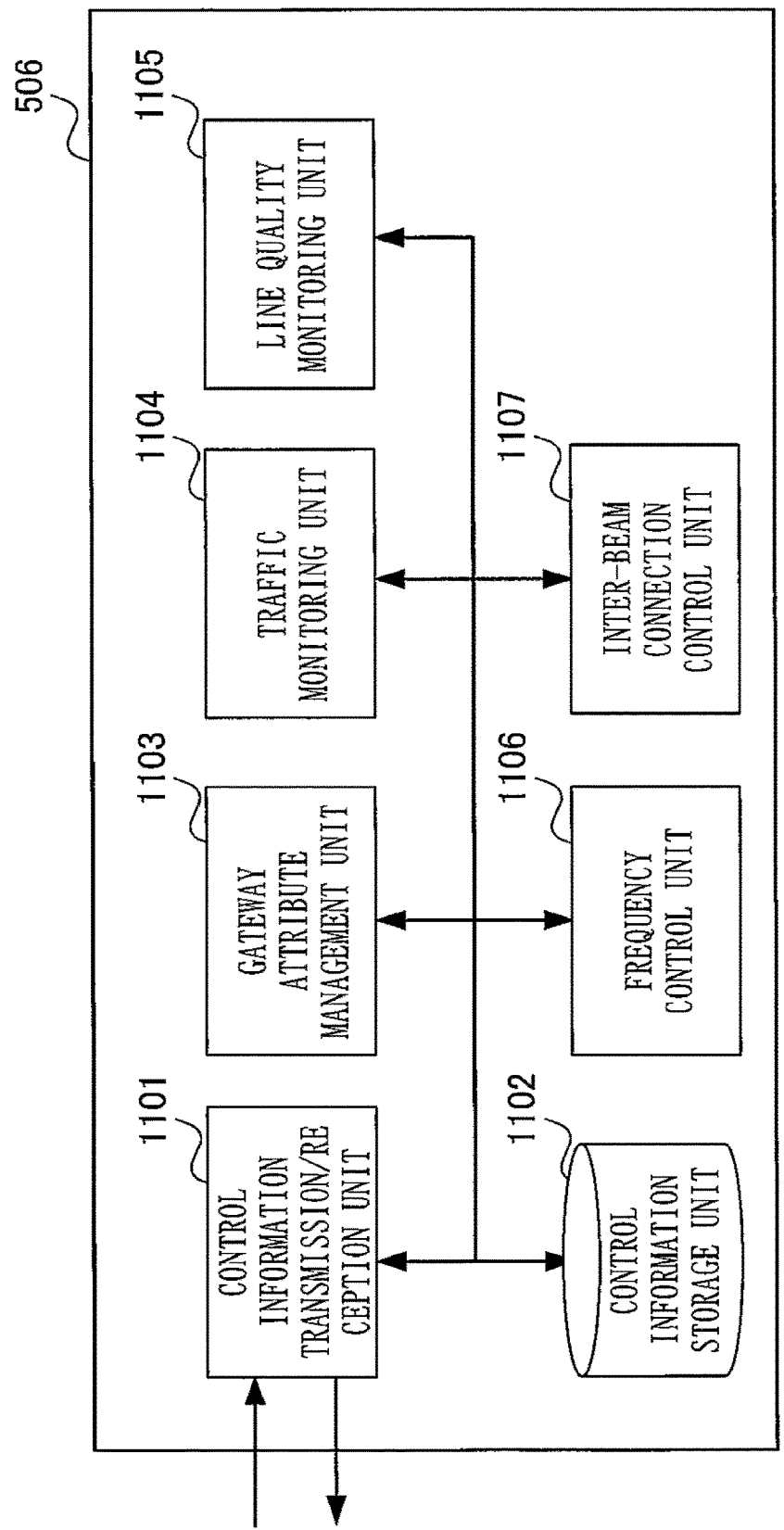
FIG. 11 is a block diagram illustrating a configuration of a communication network control station according to Embodiment 1.

FIG. 11 is a block diagram illustrating a configuration of the communication network control station 506 according to Embodiment 1. The communication network control station 506 is constituted from a control information transmission/reception unit 1101, a control information storage unit 1102, a gateway attribute management unit 1103, a traffic monitoring unit 1104, a line quality monitoring unit 1105, a frequency control unit 1106, and an inter-beam connection control unit 1107.

Subsequently, a description will be given about operations of each device and control methods by the communication network control station 506 when each of the terminals 502 transmits and receives data with one of the gateways 505 through the satellite repeater 503.

First, a procedure for transmitting data by each terminal 502 will be described.

Figure 12:
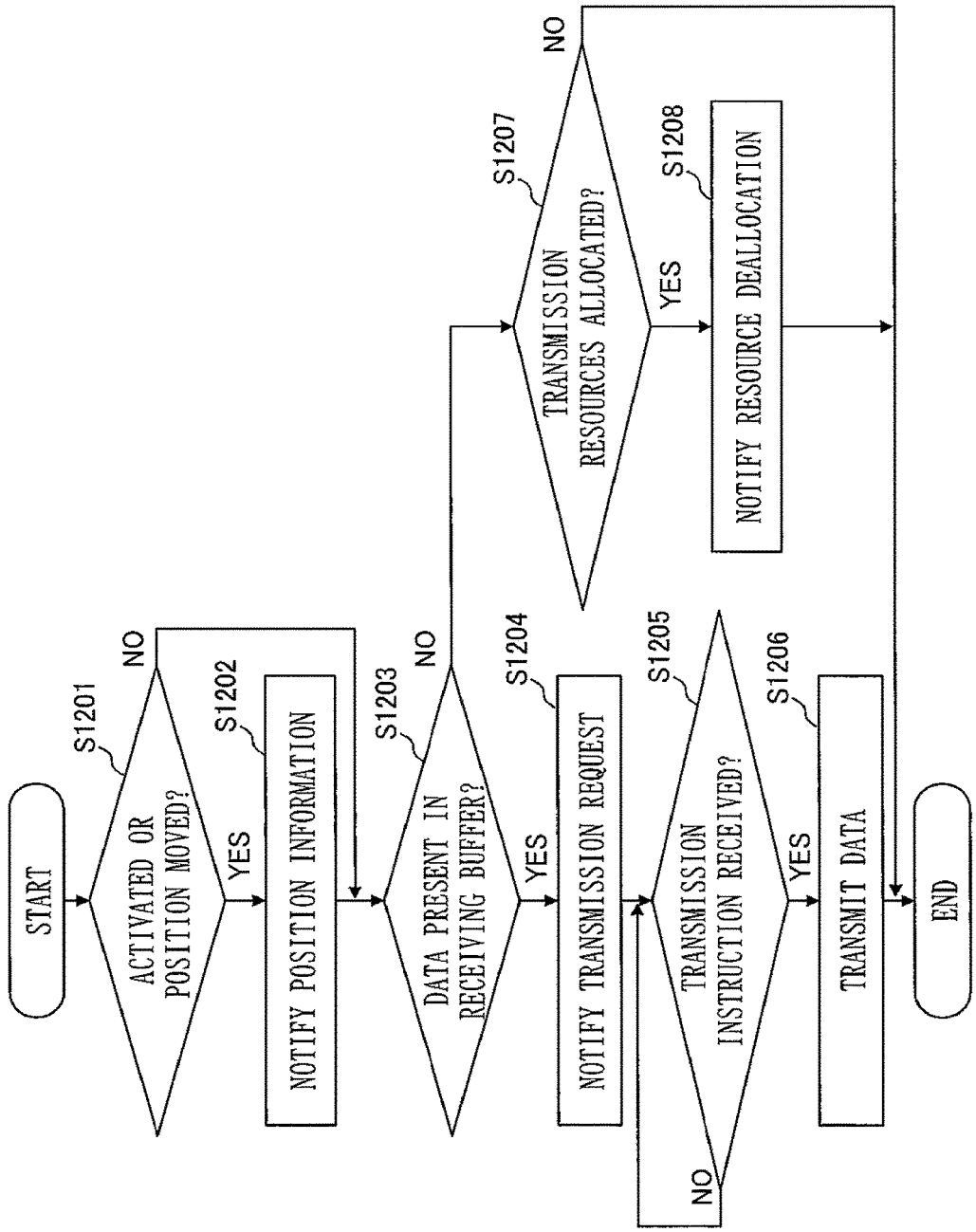
FIG. 12 is a flowchart illustrating a flow of processes by the terminal according to Embodiment 1.

FIG. 12 is a flowchart illustrating a flow of processes by the terminal 502 according to Embodiment 1.

When the terminal 502 starts the processes, the position management unit 812 determines whether the terminal 502 has been turned on or the terminal 502 has moved (S1201). If S1201 is true, the position management unit 812 obtains position information, and outputs the position information to the encoding unit 803, as transmission data. After the encoding unit 803 has encoded the position information and the modulation unit 804 has modulated the position information encoded, the wireless transmission unit 805 transmits to the satellite repeater 503 the position information encoded and modulated. The satellite repeater 503 relays the position information encoded and modulated, and the position information of the terminal 502 is notified to the gateway 505 (S1202).

The position information may be coordinates of the terminal 502 itself measured by a GPS (Global Positioning System) or the like, or may be an ID for the beam having a coverage area in which the terminal 502 itself is located. In order for the position management unit 812 to identify the ID for the beam having the coverage area in which the terminal 502 itself is located, a signal with information different for each beam given thereto should be transmitted from the satellite repeater 503, using one of a frequency, a time, and a code specified in advance. The wireless reception unit 806 should receive each signal including the ID for the beam, using the one of the frequency, the time, and the code mentioned above, and the line quality measurement unit 813 should measure a line quality of each signal and should notify the gateway 505 of the ID of the signal having a best line quality.

Subsequently, if the packet receiving unit 801 receives the data from the external communication apparatus 818, the packet receiving unit 801 stores the data in the receiving buffer 802. Then, the buffer management unit 814 determines whether the data is present in the receiving buffer 802 (S1203). If the data is present, the buffer management unit 814 notifies the transmission/reception instruction unit 816 of presence of the data, and the transmission/reception instruction unit 816 notifies the gateway 505 of a transmission request. The transmission request may be information indicating presence or absence of the request alone, or an amount of the data stored in the receiving buffer may be included in the transmission request.

After the transmission/reception instruction unit 816 has notified the transmission request, the transmission/reception instruction unit 816 determines whether the transmission/reception instruction unit 816 has received a transmission instruction from the gateway 505 (S1205). If the transmission instruction has been received, the transmission/reception instruction unit 816 instructs to transmit the data stored in the receiving buffer 802 (S1206), and finishes the processes. With respect to transmission of the data, the communication method instruction unit 815 may specify an encoding method and a modulation method set in advance to the encoding unit 803 and the modulation unit 804. If information indicating the encoding method and the modulation method is included in the transmission instruction, encoding should be performed by the encoding unit 803 and modulation should be performed by the modulation unit 804 according to that information. When a line quality varies over time, efficient communication may be performed by including in the transmission instruction the encoding method and the modulation method corresponding to the line quality. With respect to a frequency and a time at which the data is to be transmitted, the transmission/reception instruction unit 816 instructs the wireless transmission unit 805 to use values specified in the transmission instruction.

If it is determined in S1203 that the data is not present in the receiving buffer 802, the buffer management unit 814 notifies the transmission/reception instruction unit 816 of absence of the data, and the transmission/reception instruction unit 816 determines whether transmitting resources are allocated (S1207). The transmitting resources herein indicate a frequency and a time required for transmission that have been allocated to the terminal 502. If there is no data to be transmitted, the transmission/reception instruction unit 816 notifies the gateway 505 of resource deallocation, and finishes the processes (S1208). The notification of the resource deallocation should be made to the gateway 505 with an amount of data in the receiving buffer set to "0".

Now, a procedure for receiving data by each terminal 502 will be described, using FIG. 8. The wireless reception unit 806 receives the data from the satellite repeater 503 using a time and a frequency specified from the transmission/reception instruction unit 816. The wireless reception unit 806 notifies the line quality measurement unit 813 of received power. The demodulation unit 807 demodulates the data using a demodulation method specified from the communication method instruction unit 815, and notifies the line quality measurement unit 813 of a line quality measurement value. The decoding unit 808 performs data decoding using a decoding method specified from the communication method instruction unit 815, and notifies the retransmission control unit 817 of whether or not the decoding has succeeded.

If the decoding has succeeded, the packet transmitting unit 809 stores data after the decoding in the transmitting buffer 810, and transmits the data to the external communication apparatus 818. If the decoding of the data received has failed, the retransmission control unit 817 generates information indicating the failure of the decoding, and notifies the gateway of the information through the satellite repeater 503. If the gateway 505 returns to the terminal 502 the information indicating the failure of the decoding with respect to the data transmitted by the terminal 502, the retransmission control unit 817 instructs the packet receiving unit 801 to transmit the data in the receiving buffer 802 again.

Subsequently, a description will be given about an operation of relaying a signal at each of the terminals 502 and an operation of relaying a signal at each of the gateways 505 by the satellite repeater 503, using FIG. 9. Since a relay operation from the terminal 502 to the gateway 505 and a relay operation from the gateway 505 to the terminal 502 are not different for the satellite repeater 503 in this embodiment, the relay operations will be described as a common operation.

In the following description, when it is not necessary to make distinction between the two systems, the reception RF units 901a to 901b, the A/D conversion units 902a to 902b, the splitting units 903a to 903b, the gain control units 905a to 905b, the combining units 906a to 906b, the D/A conversion units 907a to 907b, and the transmission RF units 908a to 908b are respectively described as a reception RF unit 901, an A/D conversion unit 902, a splitting unit 903, a gain control unit 905, a combining unit 906, a D/A conversion unit 907, and a transmission RF unit 908.

When the reception RF unit 901 receives a signal from one of the beams, the reception RF unit 901 extracts only a desired frequency using a filter after the reception RF unit 901 has performed frequency conversion from a carrier wave frequency to an intermediate frequency. The A/D conversion unit 902 performs conversion from an analog signal to a digital signal. The splitting unit 903 splits the digital signal into sub-channel bandwidths Bc. To take an example, when the signal received from the beam has a frequency of 10 MHz and each sub-channel bandwidth Bc is 1 MHz, the splitting unit 903 generates 10 split signals of 1 MHz.

The switch unit 904 selects a path according to path information specified through the control information transmission/reception unit 910 that will be described later. Referring to FIG. 9, there are two systems of the reception RF unit 901, the A/D conversion unit 902, the splitting unit 903, the gain control unit 905, the combining unit 906, the D/A conversion unit 907, and the transmission RF unit 908. It is assumed that the two systems are respectively referred to as a system A and a system B, and that the system A receives a signal from the beam whose coverage area is set to an area A and the system B receives a signal from the beam whose coverage area is set to an area B, for example. When a part of signals from the area A is relayed to the area B, the switch unit 904 outputs the part of signals obtained by splitting by the system A to the system B according to the path information, thereby implementing relay between the different beams.

The gain control unit 905 changes an amplitude and a phase of each split signal according to a gain control amount notified through the control information transmission/reception unit 910 that will be described later. The combining unit 906 combines the signals split, and a digital signal is converted to an analog signal by the D/A conversion unit 907. Then, the analog signal is frequency-converted into a carrier frequency by the transmission RF unit 908 and is transmitted.

The electric power measurement unit 909 measures electric power of each of the signals after the splitting output by the splitting unit 903, and the control information transmission/reception unit 910 notifies the gateway 505 of the electric power. The control information transmission/reception unit 910 is an interface to transmit and receive control information with the gateway 505. It is assumed that the control information transmission/reception unit 910 in the present invention performs transmission and reception of the control information with the gateway 505. However, it is enough to establish a path for communicating the control information between the communication network control station 506 and the satellite repeater 503 illustrated in FIG. 5. Accordingly, even if it is so configured that a satellite control station not illustrated in FIG. 5 is installed on the ground to transmit and receive the control information with the satellite repeater 503, the feature of the present invention is not impaired.

Subsequently, operations of each gateway 505 will be described.

Figure 13:
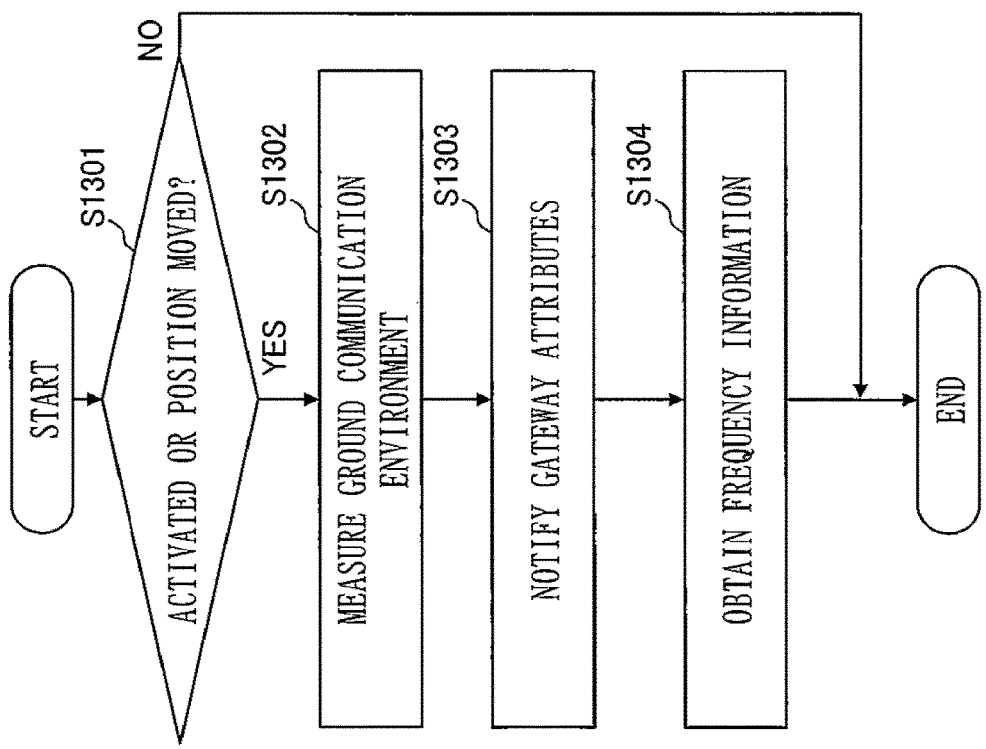
FIG. 13 is a flowchart illustrating a flow of processes by the gateway according to Embodiment 1.

FIG. 13 is a flowchart illustrating a flow of processes by the gateway 505 according to Embodiment 1.

When the gateway 505 starts the processes, the position management unit 1014 determines whether the gateway 505 has been turned on to be activated or the gateway 505 has moved (S1301). If S1301 is true, the position management unit 1014 obtains position information, and the packet transmitting unit 1011 outputs the position information of the gateway 505 itself to the communication network control station 506 (S1302). The position information may be coordinates of the gateway 505 itself measured by the GPS (Global Positioning System) or the like, or may be an ID for the beam having a coverage area in which the gateway 505 itself is located. In order for the position management unit 1014 to identify the ID for the beam having the coverage area in which the gateway 505 itself is located, the satellite repeater 503 should transmit a signal with information different for each beam given thereto, using one of a frequency, a time, and a code specified in advance. The wireless reception unit 1007 receives the signal including the ID for the beam, using the one of the frequency, the time, and the code mentioned above. The line quality measurement unit 1016 measures the line quality of each signal, and notifies the communication network control station 506 of the ID of the signal having a best line quality.

Then, the resource management unit 1015 measures statuses of wired communication paths or wireless communication paths connected to the packet receiving unit 1001 and the packet transmitting unit 1011 (S1302). A transmission rate of a wired communication path may be different by several Mbps (Mega bits per seconds) to several Gbps (Giga bps) between an ADSL (Asymmetric Digital Subscriber Line) and an optical fiber. Thus, a transmission rate is actually measured. When means for measuring the transmission rate of each communication path is not present, a guaranteed transmission rate or a nominal value may be used in place of the transmission rate.

Subsequently, the communication control unit 1013 collects attribute values of the gateway 505, and notifies the communication network control station 506 of the attribute values through the packet transmitting unit 1011 (S1303). The attribute values are information necessary for determining a bandwidth to be allocated to the gateway 505 by the communication network control station 506. To take an example, the attribute values include the beam ID or the coordinates of the gateway 505 itself held by the position management unit 1014, transmission rate information of the wired communication paths or the wireless communication paths held by the resource management unit 1015, and line quality information held by the line quality measurement unit 1016. An antenna diameter of the gateway station 506, transmission power of the gateway station 506, a maximum processing band of the gateway station 506, and the maximum number of the terminals for processing by the gateway station 506 are also included in the attribute values.

After the attribute values have been notified in S1303, the packet receiving unit 1001 obtains frequency information from the communication network control station 506, and notifies the resource management unit 1015 of the frequency information (S1304). The processes are then finished. The frequency information includes a feeder link frequency indicating a frequency and a bandwidth of each feeder link allocated for transmitting data to the satellite repeater 503 by each gateway 505, connection destination beam information indicating to which user link beam each feeder link frequency is to be connected, and a user link frequency indicating a frequency and a bandwidth of each user link.

Figure 19:
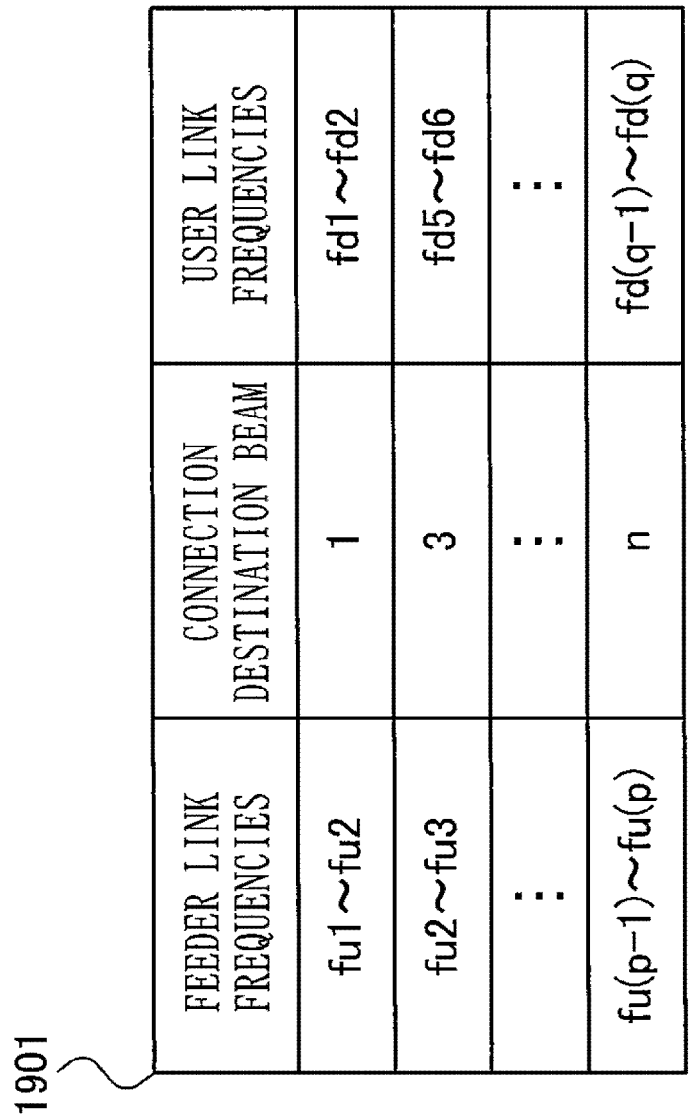
FIG. 19 is a table illustrating an example of frequency information held by a resource management unit of the gateway according to Embodiment 1.

FIG. 19 is a table illustrating an example of frequency information 1901 held by the resource management unit 1015 of the gateway 505 according to Embodiment 1. The resource management unit 105 associates and holds feeder link frequencies, connection destination beams, and user link frequencies, as the frequency information 1901.

The transmission/reception control unit 1019 determines the frequencies at which each terminal 502 located in the coverage area of each beam performs transmission and reception, according to the frequency information 1901.

Now, a procedure for transmitting data to one of the terminals 502 through the satellite repeater 503 by each gateway 505 will be described.

Figure 14:
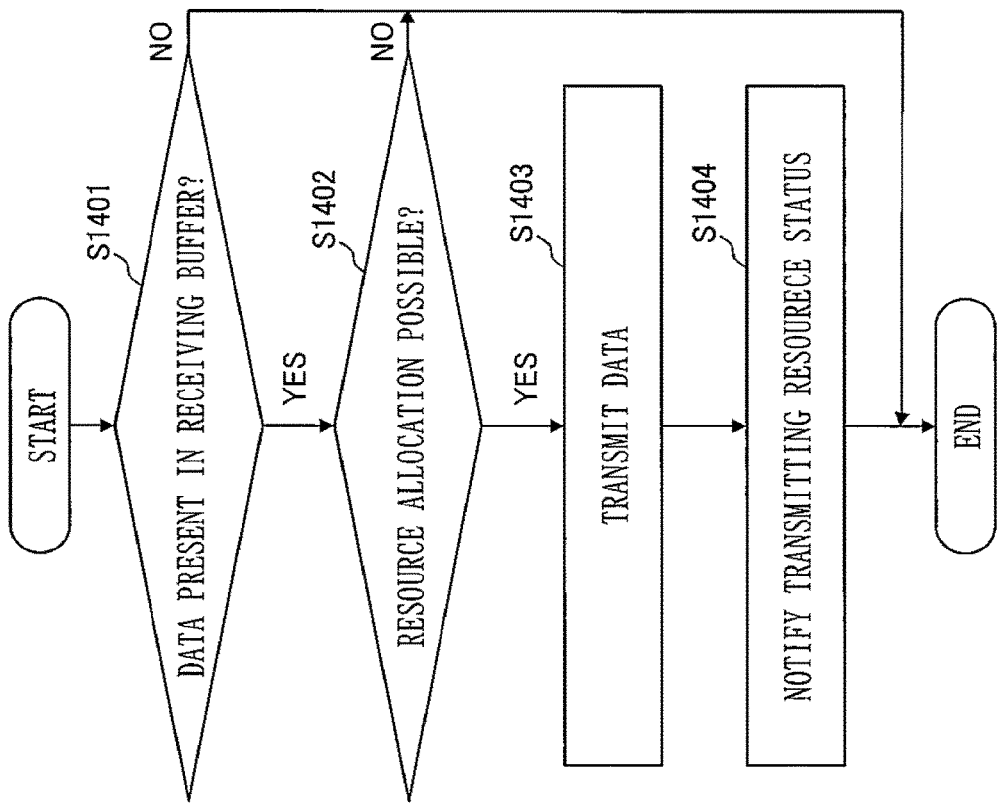
FIG. 14 is a flowchart illustrating a flow of a transmission process from the gateway to the terminal according to Embodiment 1.

FIG. 14 is a flowchart illustrating a flow of a transmission process from the gateway 505 to the terminal 502 according to Embodiment 1. The gateway 505 periodically or non-periodically executes this process.

When the packet receiving unit 1001 receives the data from the public network 507, the packet receiving unit 1001 stores the data in the receiving buffer 1002. The buffer management unit 1017 determines one of transmission destination beams for the data, and updates a data storage amount for each transmission destination beam. As a method of determining the transmission destination beam for the data, there is a method of determining one of the terminals 502 that will become a transmission destination based on an IP address given to the header portion of the data, for example. Alternatively, the buffer management unit 1017 may determine the one of the terminals 502 by collating with the position information of each terminal held by the position management unit 1014. The position information of each terminal is received in advance from each terminal 502.

The buffer management unit 1017 determines whether there is the data in the receiving buffer 1002 (S1401). If there is not the data in the receiving buffer 1002, the procedure proceeds to S1404. If there is the data, the resource management unit 1015 determines whether resources (bandwidth and power) necessary for transmitting the data can be secured (S1402). If the resources can be secured through the resource management unit 1015, the communication method control unit 1018 specifies an encoding method and a modulation method to the encoding unit 1003 and the modulation unit 1004. Predetermined methods may be used for the encoding method and the modulation method, or the encoding method and the modulation method may be determined, based on line quality information received from the terminal 502. If the resources cannot be secured, the procedure proceeds to S1404.

The multiplexing unit 1005 multiplexes data for a different one of the terminals 502 to be transmitted at a same time according to the frequency determined by the transmission/reception control unit 1019. The wireless transmission unit 1006 transmits the data received from the multiplexing unit 1005 to the terminal 502 (S1403).

The resource management unit 1015 updates a transmitting resource status, based on a data amount transmitted at that time, and the packet transmitting unit 1011 notifies the communication network control station 506 of the transmitting resource status updated (S1404). The transmitting resource status indicates a frequency usage rate of the feeder link allocated to the gateway 505 and includes a data storage amount for each transmission destination beam and a frequency allocation ratio for each transmission destination beam.

Subsequently, a procedure for receiving data from one of the terminals 502 by each gateway 505 through the satellite repeater 503 will be described.

Figure 15:
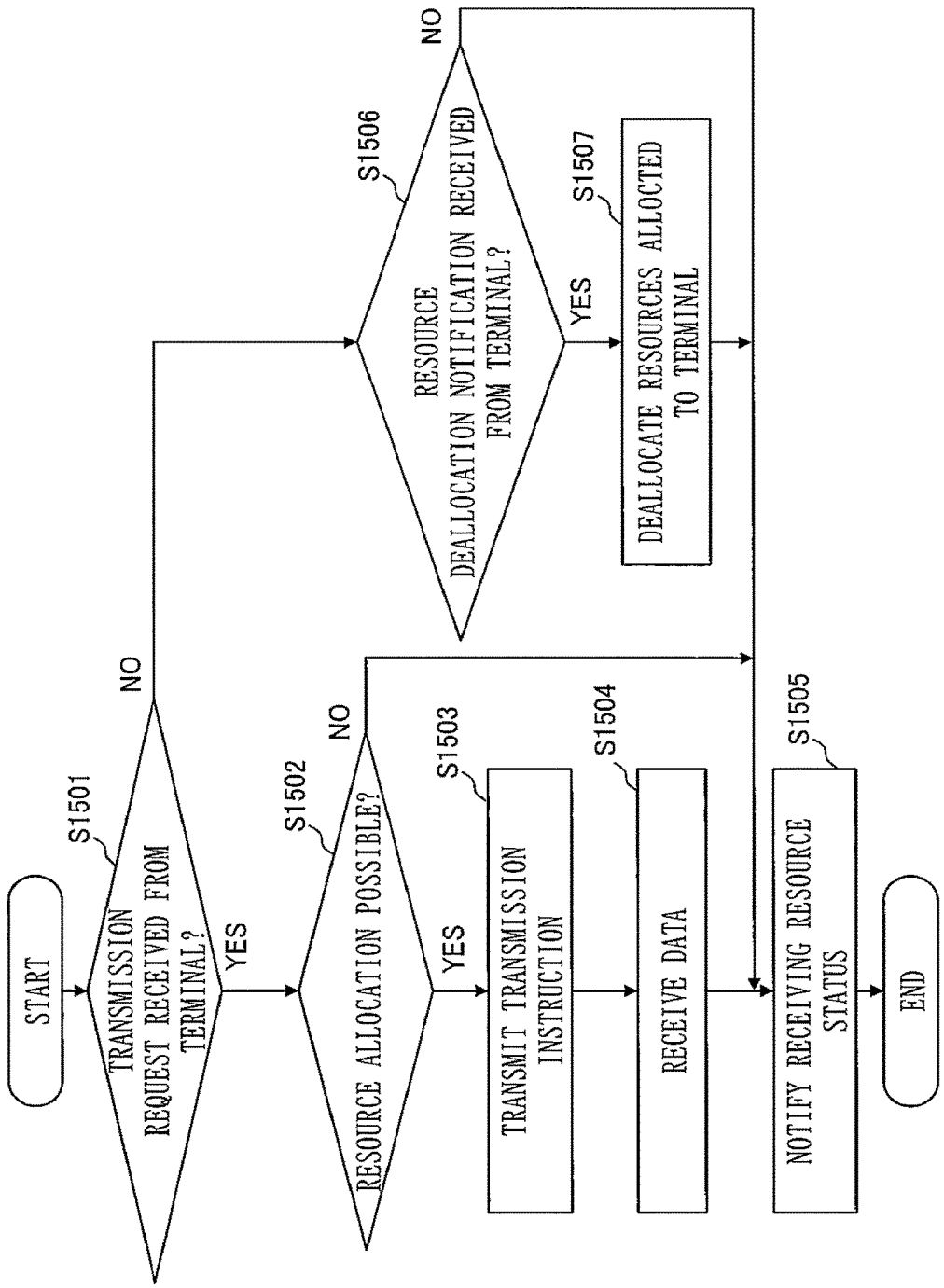
FIG. 15 is a flowchart illustrating a flow of a reception process from the terminal, by the gateway according to Embodiment 1.

FIG. 15 is a flowchart illustrating a flow of a reception process from the terminal 502 to the gateway 505 according to Embodiment 1. The gateway 505 periodically or non-periodically executes this process.

The resource management unit 1015 determines whether to have received a transmission request from the terminal 502 (S1501). If the resource management unit 1015 has received the transmission request, the resource management unit 1015 determines whether a resource (bandwidth) necessary for receiving the data from the terminal 502 can be secured (S1502). If the resource can be secured, the communication method control unit 1018 and the transmission/reception control unit 1019 determine the encoding method, the modulation method, the transmission frequency, and transmission power necessary for transmitting the data by the terminal 502. The transmission/reception control unit 1019 includes these pieces of information in a transmission instruction, and notifies the terminal 502 of the transmission instruction from the encoding unit 1003 through the wireless transmission unit 1006 (S1503). The transmission/reception control unit 1019 specifies, to the decoding unit 1010, the demodulation unit 1009, and the separation unit 1008, a decoding method, a demodulation method, and a reception frequency corresponding to the encoding method, the modulation method, and the transmission frequency that have been determined. If the resource cannot be secured, the procedure proceeds to S1505.

The wireless reception unit 1007 receives the data from the terminal 502 and notifies the line quality measurement unit 1016 of received power. The separation unit 1008 separates a signal received from each terminal using the frequency specified from the transmission/reception control unit 1019. The demodulation unit 1009 demodulates the data using the demodulation method specified from the transmission/reception control unit 1019 and notifies the line quality measurement unit 1016 of a line quality measurement value, with respect to each signal after the separation. The decoding unit 1010 decodes data using the decoding method specified from the transmission/reception control unit 1019 and notifies the retransmission control unit 1020 of whether or not the decoding has succeeded.

If the decoding has succeeded, the packet transmitting unit 1011 stores in the transmitting buffer 1012 data after the decoding. The packet transmitting unit 1011 transmits the data to the public network 507. If the decoding of the data received has failed, the retransmission control unit 1020 generates information indicating the failure of the decoding, and notifies the terminal 502 of the failure of the decoding through the satellite repeater 503. If the terminal 502 returns the information indicating the failure of the decoding with respect to the data transmitted by the gateway 505, the retransmission control unit 1020 instructs to transmit the data from the receiving buffer again.

On the other hand, if the resource management unit 1015 has not received the transmission request in S1501, the resource management unit 1015 determines whether to have received a resource deallocation notification from the terminal 502 (S1506). If the resource management unit 1015 has received the resource reallocation notification, the resource management unit 1015 deallocates resources allocated to the terminal 502. If the resource management unit 1015 has not received the resource deallocation notification, the procedure proceeds to S1505.

The resource management unit 1015 updates a receiving resource status, based on an amount of the data received at that time, and the packet transmitting unit 1011 notifies the communication network control station 506 of the receiving resource status updated (S1505). The receiving resource status indicates a frequency usage rate of the feeder link allocated to the gateway 505, and includes an amount of transmission data requested by each terminal 502 located in the coverage area of each transmission source beam and a frequency allocation ratio for each transmission source beam.

Now, a control procedure by the communication network control station 506 will be described.

Figure 16:
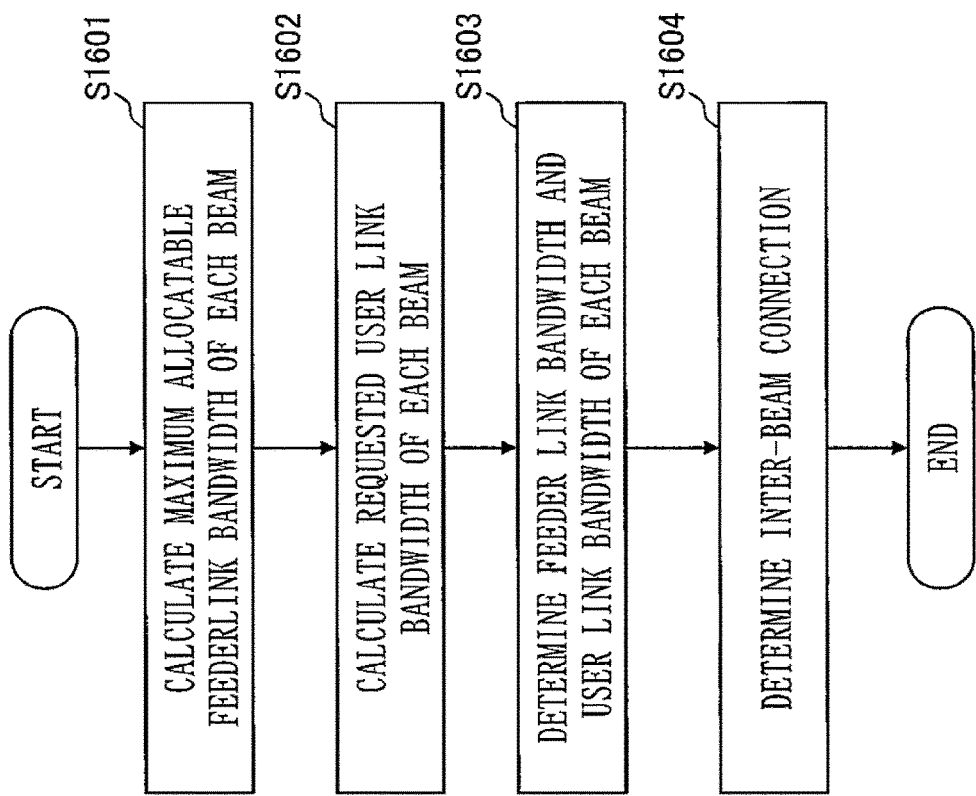
FIG. 16 is a flowchart illustrating a flow of processes by the communication network control station according to Embodiment 1.

FIG. 16 is a flowchart illustrating a flow of processes by the communication network control station 506 according to this Embodiment 1. The communication network control station 506 periodically or non-periodically executes these processes.

When the control information transmission/reception unit 1101 receives various control information from each gateway 505, the control information transmission/reception unit 1101 stores the various control information in the control information storage unit 1102. The various control information includes the gateway attributes, the transmitting resource status, and the receiving resource status that have been mentioned above.

The gateway attribute management unit 1103 calculates the maximum value of a feeder link bandwidth that can be allocated to each beam, based on the gateway attributes of each gateway 505 stored in the control information storage unit 1102 (S1601). It is assumed that the maximum value of the feeder link bandwidth is a total value of bandwidths with which all the gateways 505 located in the coverage area of one beam can perform transmission or reception. The gateway attribute management unit 1103 calculates each of a transmission bandwidth and a reception bandwidth, and notifies the frequency control unit 1106 of the transmission bandwidth and the reception bandwidth.

Subsequently, the traffic monitoring unit 1104 calculates a requested user link bandwidth of each beam, based on the transmitting resource status and the receiving resource status of each gateway stored in the control information storage unit 1102. With respect to the requested user link bandwidth as well, the traffic monitoring unit 1104 calculates each of a transmission bandwidth and a reception bandwidth seen from each terminal 502 and notifies the frequency control unit 1106 of the transmission bandwidth and the reception bandwidth (S1602).

Then, the frequency control unit 1106 determines the feeder link bandwidth and the user link bandwidth of each beam, based on the maximum value of the feeder link bandwidth and the requested user link bandwidth notified (S1603). Details of determination of the feeder link bandwidth and the user link bandwidth will be described later. When a plurality of the gateways 505 is present in one beam, the frequency control unit 1106 may distribute the feeder link bandwidth into the plurality of the gateways 505 within a range not exceeding a bandwidth that can be processed by each gateway 505 managed by the gateway attribute management unit 1103.

The inter-beam connection control unit 1107 determines an inter-beam connection relationship and a frequency connection relationship, based on the user link bandwidth and the feeder link bandwidth allocated to each beam (S1604). The control information transmission/reception unit 1101 notifies the satellite repeater 503 and each gateway 505 of the inter-beam connection relationship and the frequency connection relationship, as path information for the switch unit 904 of the satellite repeater 503 and frequency information for the gateway 505. The processes are then finished.

Now, the process of determining the feeder link bandwidth and the user link bandwidth by the frequency control unit 1106 will be described.

Figure 17:
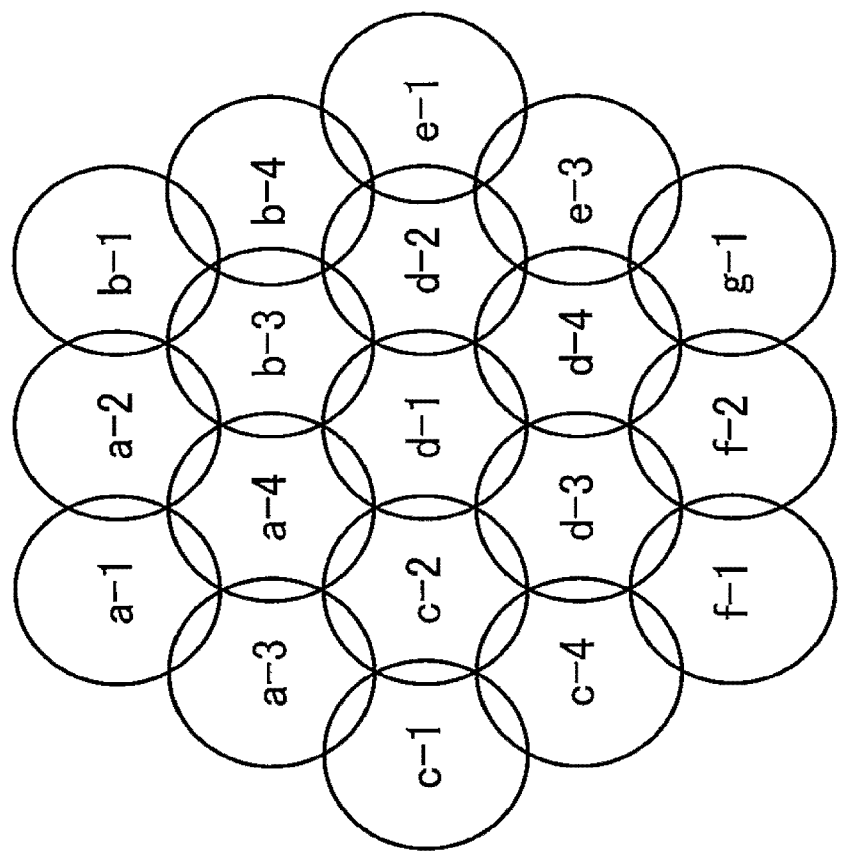
FIG. 17 is a diagram illustrating a beam-cluster relationship according to Embodiment 1.

FIG. 17 is a diagram illustrating a beam-cluster relationship according to this Embodiment 1.

It is assumed that user and feeder link beams are disposed in a same location. Referring to FIG. 17, reference signs a to g are signs each representing a cluster, and one cluster is formed by four beams. Reference numerals 1 to 4 represent sub-numbers in each cluster.

Figure 18:
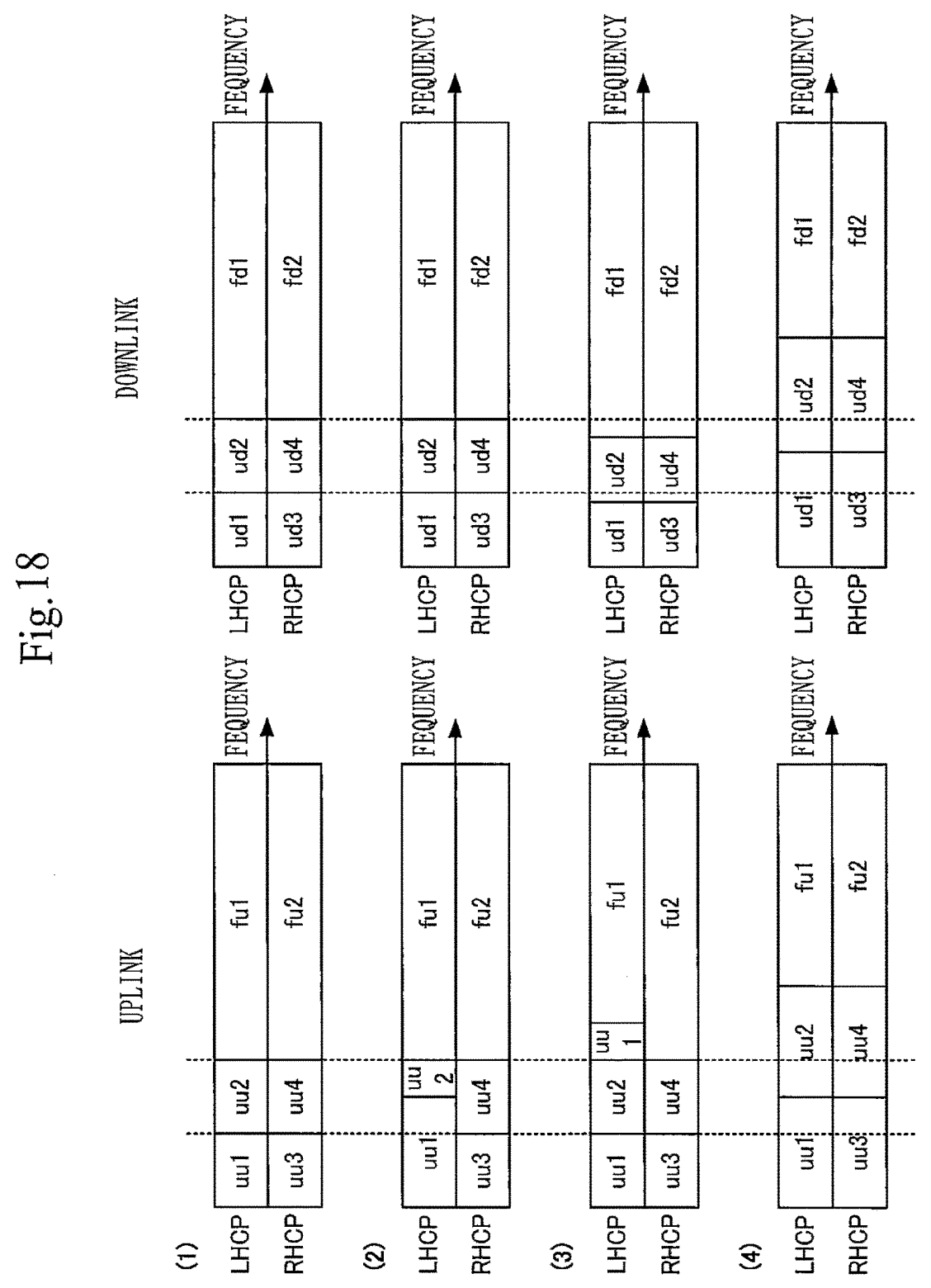

FIG. 18 includes diagrams illustrating examples of band allocation to the feeder link beams and the user link beams according to Embodiment 1. FIG. 18 illustrates the examples of band allocation for the uplink and the downlink seen from each terminal 502 or each gateway 505. Reference signs uu1 to uu4 and ud1 to ud4 are each a band to be allocated to the user link.

By allocating uu1 to beams a-1 to g-1 corresponding to the sub-numbers 1 in FIG. 17, by allocating uu2 to beams a-2 to f-2 corresponding to the sub-numbers 2 in FIG. 17, by allocating uu3 to beams a-3 to e-3 corresponding to the sub-numbers 3 in FIG. 17, and by allocating uu4 to beams a-4 to d-4 corresponding to the sub-numbers 4 in FIG. 17, four-color repeated use is implemented.

On the other hand, reference signs fu1, fu2, fd1, and fd2 are each a band to be allocated to the feeder link. Though two colors (one frequency×two polarizations) are used for bands in the feeder link, this is an example. Four colors may be used as in the user link. In the case of the two-color repeated use, only when combination of the same frequency and the different polarizations is possible, band allocation is performed for the beams for the gateways 505. To take an example, when the gateway attribute management unit 1103 confirms that a first one of the gateways 505 is located in the beam b-1, a second one of the gateways 505 is located in the beam b-3, and a third one or more of the gateways 505 do not operate in the beams a-2, b-4, a-4, and d-2, the frequency control unit 1106 respectively allocates fu1 and fu2 to the beam b-1 and the beam b-3.

In the case of the one-color repeated use, when the gateway attribute management unit 1103 confirms that a first one of the gateways 505 is located in the beam b-1, a second one or more of the gateways 505 are located in the beams other than the beam a-2, a-4, b-3, d-2, and b-4, the frequency control unit 1106 allocates the fu1 and fu2 to the beam b-1.

A case (1) in FIG. 18 is a case where the band has been equally allocated to each user link beam. At a time of an operation start of the system, the requested user link bandwidth of each beam cannot be acquired. Thus, the frequency control unit 1106 operates, using the case (1).

When the requested user link bandwidth of the beam d-1 increases to exceed the bandwidth of the uu1 allocated in the case (1), for example, the frequency control unit 1106 increases a bandwidth to be allocated to the beam d-1, as illustrated in a case (2) or a case (3).

In the case (2), the frequency control unit 1106 reduces the uu2 to be allocated to each of the beams c-2 and d-2 adjacent to the beam d-1 while increasing the uu1 to be allocated to the beam d-1. In this case, a maximum uplink capacity decreases for each of the beams c-2 and d-2. However, the feeder link bandwidth is not changed for each of the beams c-2 and d-2. Thus, the downlink is not affected.

In the case (3), a portion of the band to be allocated to the feeder ink is allocated as the band uu1 for the beam d-1. When it is confirmed that no gateway 505 is installed in the beam d-1, the frequency control unit 1106 does not change band allocation for the downlink as in the case (3). It is because the band allocation for the downlink is not affected by the change. Also when the traffic monitoring unit 1104 confirms that there is an unused band according to the transmitting resource status with respect to the band fu1 of the beam d-1, the frequency control unit 1106 does not change band allocation for the downlink as in the case (3).

Meanwhile, in the case (4), when the traffic monitoring unit 1104 confirms that the band is fully allocated according to the transmitting resource status with respect to the band fu1 of the beam d-1, band allocation of the band fu1 is reduced, and bands of ud1 to ud4 are reduced, as in the allocation for the downlink in the case (3).

As mentioned above, the frequency control unit 1106 determines bandwidths for the user link and the feeder link. The frequency control unit 1106 sets the bandwidths for each of the user link and the feeder link to x times (in which x is an integer) the sub-channel bandwidth Bc that is a minimum unit of the bandwidth of a signal to be split by the splitting unit 903 of the satellite repeater 503. Accordingly, when the satellite repeater 503 switches frequency connection and beam connection, frequency rearrangement may be performed with no spacing.

When the satellite communication system is constituted using two or more different types of beams, frequency repeated use becomes difficult between the different types of beams.

Figure 20:
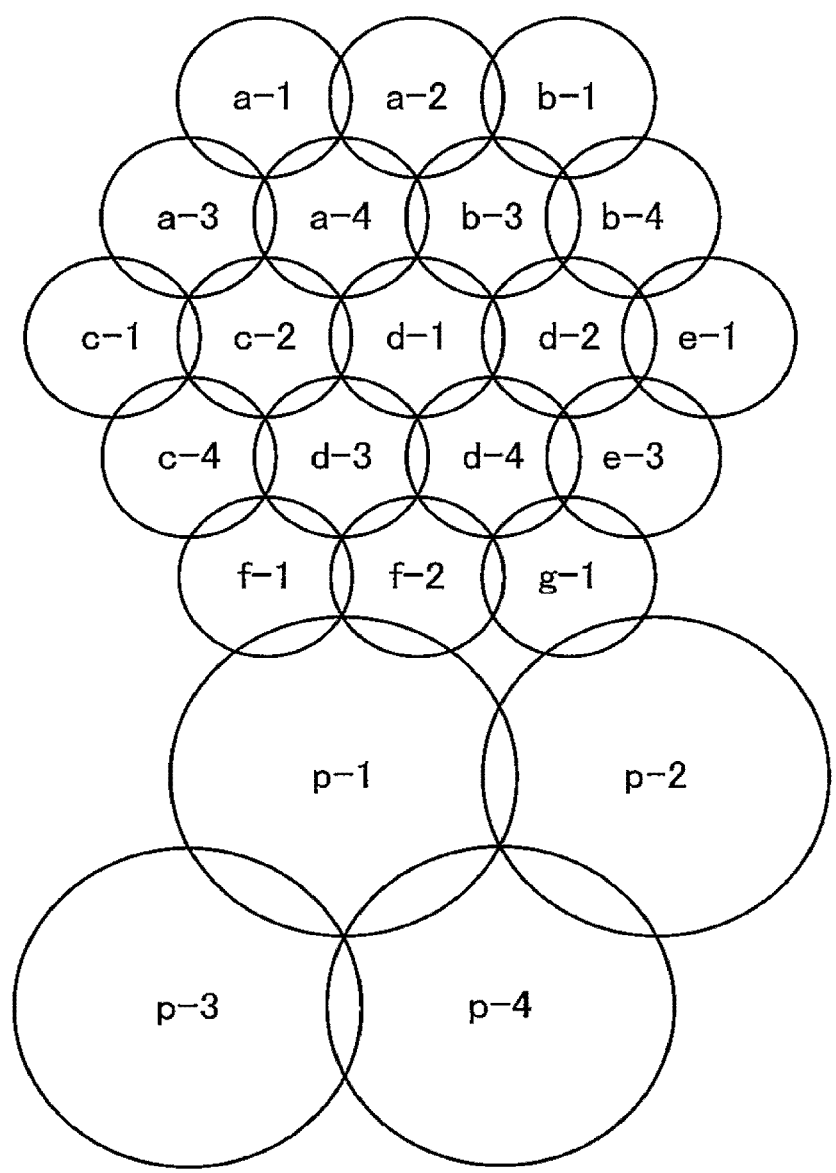
FIG. 20 is a diagram illustrating a beam-cluster relationship according to Embodiment 1.

FIG. 20 is a table illustrating a beam-cluster relationship according to Embodiment 1. Reference signs a to g are the signs illustrating the clusters and reference sign p is a sign illustrating a cluster, and one cluster is formed by four beams. Reference numerals 1 to 4 represent the sub-numbers in each cluster. It is assumed that reference signs a-1 to g-1 indicate narrow beams, and reference signs p-1 to p-4 indicate broad beams. Since the narrow beams and the broad beams are different in beam diameter, an amount of interference between the beams does not become equal, so that the frequency repeated use cannot be performed. In such a case, four-color repeated use should be performed using frequencies that are different for each beam type, and a user link bandwidth should be determined for each beam type. A bandwidth ratio between the beam types should be determined according to a requested service link bandwidth ratio for each beam.

The control procedure by the communication network control station 506 illustrated in FIG. 16 may be periodically executed at a predetermined time, or may be executed only when a change occurs in the information managed by the gateway attribute management unit 1103 and the traffic monitoring unit 1104.

Though one satellite repeater 503 is provided in FIG. 5, two or more satellite repeaters 503 may be provided. Since satellite orbits are different in this case, a user link band and a feeder link band may be reused by each of the satellite repeaters 503. Accordingly, the communication network control station 506 should perform the processes illustrated in FIG. 16 for each satellite repeater 503. Further, in addition to frequencies for each beam and inter-beam connection, the communication network control station 506 should notify each gateway 505 of information for determining the satellite repeaters 503 of transmission and reception destinations. Each gateway 505 should notify each terminal 502 of the information for determining the satellite repeaters 503 of the transmission and reception destinations, in a similar way.

Two or more satellite repeaters 503 may be present at different satellite altitudes such as on a medium earth orbit (go-around orbit) and on a high earth orbit (geostationary orbit). In this case, the go-around orbit and the geostationary orbit are seen in a same direction from a surface of the earth at a certain period. Thus, when a same frequency is used, interference occurs between the satellites. Thus, a priority for band-use may be given to one of the go-around orbit or the geostationary orbit, and transmission or reception may be permitted only for the satellite repeater 503 holding the priority at a time when the interference occurs.

When a different system on the ground is performing transmission or reception using a same frequency as the satellite communication system according to the present invention, a priority for band-use may be given to one of the systems, and the line quality measurement unit 813 of each terminal 502 and the line quality measurement unit 1016 of each gateway 505 may measure an electric wave usage status of the different system and notify the communication network control station 506 of the electric wave usage status . Then, the communication network control station 506 may determine the user link bandwidth and the feeder link bandwidth according to the usage status of the different system.

It is further assumed that, in FIG. 6, the satellite repeater 503 forms the n beams. However, less than n beams may transmit or receive signals at a same time. In this case, in order to establish communications between the terminals 502 and the gateways 505 located in the coverage areas of the n beams, the communication network control station 506 performs time division of transmission and reception of each beam. The number of devices to be mounted on the satellite repeater 503 may be thereby reduced.

In this case, by specifying from the communication network control station 506 times when transmission and reception by each beam are permitted for each gateway 505 and the satellite repeater 503, synchronization may be achieved. A time division ratio may be changed among the beams, according to the numbers of the terminals 502 and the gateways 505 located in the coverage areas of the respective beams, the transmitting resource status, and the receiving resource status. To take an example, by constantly performing transmission and reception by each beam having a coverage area in which one or more of the gateways 505 are located and periodically permitting transmission and reception by each beam having a coverage area where one or more of the terminals 502 alone are located, the number of devices for the satellite repeater 503 may be reduced while ensuring a requested transmission rate and a requested coverage area.

Thus, in the satellite communication system to relay communication between each of the terminals and each of the gateways installed on the ground by the satellite repeater, the satellite repeater forms the user link beam for communicating with the terminal and the feeder link beam for communicating with the gateway in a same area, and changes a frequency or polarization association with respect to each of the user link beam and the feeder link beam, based on a traffic situation. Frequency and beam connection relationships may be flexibly changed according to a change in an amount of traffic after satellite launching. Accordingly, efficient frequency use may be made. When a whole country is to be covered by the user link beams, the user and feeder link beams may be formed in a same coverage area.

When a disaster occurs in a specific area, for example, the need for using satellite communication as an alternative to a ground communication network increases. In such a case, in this embodiment, the bandwidth of a user link beam that covers a disaster area may be temporarily increased.

When there is rain within a specific feeder link beam, for example, the transmission rate of the user link beam connected to the feeder link is reduced or the user link beam is shut down due to rain attenuation. In such a case, in this embodiment, a change to the feeder link beam with no occurrence of rain may be made.

Embodiment 2

In the above-mentioned Embodiment 1, the frequency connection relationship and the beam connection relationship are changed according to a change in an amount of traffic. In this embodiment, an embodiment will be given where, in addition to a change in an amount of traffic, the number of gateways is changed.

The number of gateways to be operable may be reduced when a disaster occurs in a specific area or due to a failure or the like, for example. Since the Ka-band has a large amount of rain attenuation, an operation rate may be reduced due to rain. Further, the number of gateways after satellite launching may be increased due to planned facility investment.

Since configurations of the satellite communication system, each terminal 502, the satellite repeater 503, each gateway 505, and the communication network control station 506 in this embodiment are same as those in Embodiment 1, description of them will be omitted. In this embodiment methods of controlling frequency connection and inter-beam connection by the frequency control unit 1106 and the inter-beam control unit 1107 in the communication network control station 506 are different. Accordingly, in the following description, only the difference will be described.

First, a description will be directed to a case where the number of the gateways 505 has been reduced, due to a disaster or a failure.

Based on information notified from each gateway, the gateway attribute management unit 1103 confirms an operating status of the gateway 505. When a communication amount of 0 is notified according to the transmitting resource status or the receiving resource status, or no notification is received from one of the gateways 505, for example, the gateway 505 is determined not to be operating. A health check request may be transmitted from the communication network control station 506 to each gateway in order to grasp the operating status.

When one of the gateways 505 is determined not to be operating, the gateway attribute management unit 1103 sets a bandwidth that may be processed by the gateway 505 to 0, and reallocates frequencies and connection of each beam according to S1601 to S1604 in FIG. 16 described in Embodiment 1.

Subsequently, a description will be directed to a case where traffic with respect to a specific beam has increased.

In Embodiment 1, when traffic has increased in the beam d-1 in FIG. 17, the user link bandwidth has been increased as in the case (2) or (3) in FIG. 18. Both of the cases (2) and (3), however, have a disadvantage that the user link band or the feeder link band of an adjacent beam is reduced. Then, by newly adding the gateway 505 to spatially reuse the feeder link band, the above-mentioned disadvantage may be solved.

When the gateway 505 is installed in the beam b-3 in FIG. 17, for example, the gateway 505 is added for the beam a-3 or the beam d-3. One-color repeated use may be implemented, so that a feeder link bandwidth that may be processed by the whole system is doubled. That is, bandwidths of fu1 and fu2 to be allocated to the feeder links may be reduced, and surplus portions may be additionally allocated to the user link bands uu1 to uu4, as illustrated in the case (4).

As another aspect, when the gateway 505 is installed in the beam b-3, and the requested user link bandwidth of the beam b-3 is increased, the gateway 505 is added in the beam for which frequency repeated use may be made with the beam b-3. Further, by setting the feeder link bandwidth allocated to the beam b-3 to 0, all the user link bands may also be allocated to the beam b-3.

The communication network control station 506 should use position information of each gateway managed by the gateway attribute management unit 1103 in order to determine addition of the gateway 505. The gateway attribute management unit 1103 may determine the gateway 505 whose position information has been newly added, as a new addition.

A procedure after the gateway 505 has been added should be executed according to S1601 to S1604 in FIG. 16 described in Embodiment 1.

The gateway 505 to be newly added does not need to be fixedly set. To take an example, the gateway 505 may be the one that is mounted on a vehicle or the like and is movable. The gateway may be added according to a situation such as at a time of a disaster. In this case, the position of the gateway 505 may vary with time. However, by notifying the communication network control station 506 of attributes of the gateway according to the flowchart illustrated in FIG. 13, inter-beam connection may be updated. Further, when the gateway 505 passes a beam boundary, the gateway attribute management unit 1103 and the inter-beam connection control unit 1107 may control the inter-beam connection based on a movement history of the gateway 505 in order to prevent occurrence of frequent beam switching. A same frequency and a same polarization may be allocated to adjacent two beams, for example. This case may be implemented by causing the switch unit 904 of the satellite repeater 303 to include a function of copying a portion of split signals and simultaneously transmitting the portion of split signals by the two beams that are different.

A specific one of the gateways 505 may be unoperated or an operation rate of the specific gateway 505 may be remarkably reduced due to rain. In this case, the line quality monitoring unit 1105 of the communication network control station 506 identifies, from line quality information acquired from each terminal 502 and each gateway 505, the beam covering a rainfall area. The frequency control unit 1106 may allocate a frequency band (e.g., a Ku-band) having small rain attenuation to the beam covering the rainfall area. According to a different aspect, the inter-beam connection control unit 1107 may switch inter-beam connection so that a signal to be transmitted by the beam covering the rainfall area may be transmitted or received by a different beam. To take an example, assume a case where an operation rate of the d-3 is reduced due to rain in a process of transmitting a signal to the gateway 505 located in the d-3 by the terminal 502 located in the coverage area of the d-1 in FIG. 17. Then, in addition to the gateway 505 in the d-3, the gateway 505 located in the b-3 with no rainfall may be used to relay the signal. This case may be implemented by causing the switch unit 904 of the satellite repeater 503 to include the function of copying a portion of split signals and simultaneously transmitting the portion of split signals by two of the beams that are different.

The communication network control station thus changes one of a frequency or a polarization of a user link beam, a frequency or a polarization of a feeder link beam, or an association between the user link beam and the feeder link beam, according to the gateway operating status indicating addition or deletion of one or more of the gateways. The number of the feeder link beams may be therefore changed. The life of a satellite in recent years is approximately 15 years, and flexible accommodation of a change in demand after satellite launching is required. To take an example, it may also be so arranged that, immediately after the satellite launching, a small number of gateways are disposed, and the number of the gateways is increased according to an increase in the demand.

In this embodiment, the number of the gateways may be flexibly changed after satellite launching. Addition of the gateway in response to a change in an amount of traffic or restoration of a communication path in a case where one of the gateways becomes unoperated, such as at a time of a disaster, may be flexibly achieved.

REFERENCE SIGNS LIST

101-1 to 101-*n*, 501-1 to 501-*n*: user link beam,
102-1*a* to 102-*nb*, 502-1*a* to 502-*nb*: terminal
103, 503: satellite repeater
104-1 to 104-*m*, 504-1 to 504-*n*: feeder link beam
105-1 to 105-*m*, 505-1 to 505-*m*: gateway
106, 507: public network
506: communication network control station
301-L to 302-L, 701-L to 708-L: left hand circular polarization
301-R to 302-R, 701-R to 708-R: right hand circular polarization
801: packet receiving unit
802: receiving buffer
803: encoding unit
804: modulation unit
805: wireless transmission unit
806: wireless reception unit
807: demodulation unit
808: decoding unit
809: packet transmitting unit
810: transmitting buffer
811: communication control unit
812: position management unit
813: line quality measurement unit
814: buffer management unit
815: communication method instruction unit
816: transmission/reception instruction unit
817: retransmission control unit
818: external communication apparatus
901, 901*a* to 901*b*: reception RF unit
902, 902*a* to 902*b*: A/D conversion unit
903, 903*a* to 903*b*: splitting unit
904: switch unit
905, 905*a* to 905*b*: gain control unit
906, 906*a* to 906*b*: combining unit
907, 907*a* to 907*b*: D/A conversion unit
908, 908*a* to 908*b*: transmission RF unit
909: electric power measurement unit
910: control information transmission/reception unit
1001: packet receiving unit
1002: receiving buffer
1003: encoding unit
1004: modulation unit
1005: multiplexing unit
1006: wireless transmission unit
1007: wireless reception unit
1008: separation unit
1009: demodulation unit
1010: decoding unit
1011: packet transmitting unit
1012: transmitting buffer
1013: communication control unit
1014: position management unit
1015: resource management unit
1016: line quality measurement unit
1017: buffer management unit
1018: communication method control unit
1019: transmission/reception control unit
1020: retransmission control unit
1101: control information transmission/reception unit
1102: control information storage unit
1103: gateway attribute management unit
1104: traffic monitoring unit
1105: line quality monitoring unit
1106: frequency control unit
1107: inter-beam connection control unit
1901: frequency information

The invention claimed is:

1. A satellite communication system to relay communication between a terminal and a gateway installed on a ground through a satellite repeater,
wherein the satellite repeater
forms a user link beam for communicating with the terminal and a feeder link beam for communicating with the gateway in a same area, and
based on a currently detected traffic situation for current communication between the terminal and the gateway, performs at least one of:
changing at least one of a center frequency, a bandwidth, and a polarization to be allocated to the user link beam;
changing at least one of a center frequency, a bandwidth, and a polarization to be allocated to the feeder link beam; and
changing an association between the user link beam and the feeder link beam.

2. The satellite communication system according to claim 1, comprising:
a communication network control station to notify the satellite repeater and the gateway of at least one of:
the at least one of the center frequency, the bandwidth, and the polarization to be allocated to the user link beam;
the at least one of the center frequency, the bandwidth, and the polarization to be allocated to the feeder link beam; and the association between the user link beam and the feeder link beam.

3. The satellite communication system according to claim 2,
wherein the gateway holds a line capacity of connecting a plurality of gateways and notifies the communication network control station of the capacity.

4. The satellite communication system according to claim 2,
wherein the gateway measures a line capacity of a feeder link allocated to the gateway itself and notifies the communication network control station of the line capacity and a beam identifier for identifying the feeder link beam.

5. The satellite communication system according to claim 2,
wherein the gateway notifies the communication network control station of a frequency usage rate of a feeder link, an amount of data to be transmitted to a user link, and an amount of data to be received from the user link.

6. The satellite communication system according to claim 2,
wherein the communication network control station reuses a frequency to be allocated to the feeder link beam, based on a positional relationship among a plurality of the feeder link beams.

7. The satellite communication system according to claim 2,
wherein based on a gateway operating status indicating addition or deletion of the gateway, the communication network control station performs at least one of:
changing the at least one of the center frequency, the bandwidth, and the polarization to be allocated to the user link beam;
changing the at least one of the center frequency, the bandwidth, and the polarization to be allocated to the feeder link beam; and
changing the association between the user link beam and the feeder link beam.

8. The satellite communication system according to claim 2, wherein
the communication network control station changes at least one of the center frequency, the bandwidth, and the polarization to be allocated to the feeder link beam, based on a line quality notified from the gateway.

9. The satellite communication system according to claim 2,
wherein the communication network control station associates the user link beam with a plurality of the feeder link beams.

10. A satellite repeater repeating method to relay communication between a terminal and a gateway installed on a ground,
to form a user link beam for communicating with the terminal and a feeder link beam for communicating with the gateway in a same area, and
the method comprising, based on a currently detected traffic situation for current communication between the terminal and the gateway, to perform at least one of:
changing at least one of a center frequency, a bandwidth, and a polarization to be allocated to the user link beam;
changing at least one of a center frequency, a bandwidth, and a polarization to be allocated to the feeder link beam; and
changing an association between the user link beam and the feeder link beam.

11. A communication network control station to control a satellite communication system to relay communication between a terminal and a gateway installed on a ground through a satellite repeater, the communication network control station comprising:
a frequency controller to change at least one of a center frequency, a bandwidth, and a polarization to each of a user link beam for performing communication between the terminal and the satellite repeater and a feeder link beam for performing communication between the gateway and the satellite repeater, based on a currently detected resource status of a traffic situation for current communication between the terminal and the gateway notified from the gateway; and
an inter-beam connection controller to determine an association between the user link beam and the feeder link beam.

12. The communication network control station according to claim 11,
wherein the frequency controller reuses a frequency to be allocated to the feeder link beam, based on a positional relationship among a plurality of the feeder link beams.

13. The communication network control station according to claim 11, comprising:
a gateway attribute manager to hold a gateway operating status indicating addition or deletion of the gateway,
wherein based on the gateway operating status, the frequency controller performs at least one of:
changing at least one of the center frequency, the bandwidth, and the polarization to be allocated to the user link beam;
changing at least one of the center frequency, the bandwidth, and the polarization to be allocated to the feeder link beam; and
changing the association between the user link beam and the feeder link beam.

14. The communication network control station according to claim 13, wherein the gateway attribute manager holds a line quality notified from the gateway; and
wherein the frequency controller changes the at least one of the center frequency, the bandwidth, and the polarization to be allocated to the feeder link beam, based on the line quality notified from the gateway attribute manager.

15. The communication network control station according to claim 11,
wherein the inter-beam connection controller associates the user link beam with a plurality of the feeder link beams.

16. A satellite communication method of relaying communication between a terminal and a gateway installed on a ground through a satellite repeater,
wherein the satellite repeater
forms a user link beam for communicating with the terminal and a feeder link beam for communicating with the gateway in a same area, and
based on a currently detected traffic situation for current communication between the terminal and the gateway, performs at least one of:
changing at least one of a center frequency, a bandwidth, and a polarization of the user link beam;
changing at least one of a center frequency, a bandwidth, and a polarization of the feeder link beam; and
changing an association between the user link beam and the feeder link beam.

17. A method to perform data transmission with a gateway installed on a ground through a satellite repeater, comprising:
   a terminal performing data transmission with a satellite repeater by a user link beam used in a same area as a feeder link beam used for data transmission between the satellite repeater and the gateway, the satellite repeater performing, based on a currently detected traffic situation for current communication between the terminal and the gateway, at least one of changing at least one of a center frequency, a bandwidth, and a polarization to be allocated to the user link beam and changing an association between the user link beam and the feeder link beam.

* * * * *